US012624954B2

(12) United States Patent
Xiao

(10) Patent No.: US 12,624,954 B2
(45) Date of Patent: May 12, 2026

(54) METHOD AND APPARATUS FOR PREDICTING SUCCESS RATE OF LANE CHANGING BY VEHICLE, COMPUTER DEVICE, AND STORAGE MEDIUM

(71) Applicant: Tencent Technology (Shenzhen) Company Limited, Shenzhen (CN)

(72) Inventor: Ning Xiao, Shenzhen (CN)

(73) Assignee: Tencent Technology (Shenzhen) Company Limited., Shenzhen (CN)

(*) Notice: Subject to any disclaimer, the term of this patent is extended or adjusted under 35 U.S.C. 154(b) by 80 days.

(21) Appl. No.: 18/895,914

(22) Filed: Sep. 25, 2024

(65) Prior Publication Data

US 2025/0012579 A1     Jan. 9, 2025

Related U.S. Application Data

(63) Continuation of application No. PCT/CN2023/134641, filed on Nov. 28, 2023.

(30) Foreign Application Priority Data

Nov. 30, 2022    (CN) .......................... 202211514504.6

(51) Int. Cl.
*G01C 21/34*        (2006.01)
*G01C 21/36*        (2006.01)

(52) U.S. Cl.
CPC ..... *G01C 21/3415* (2013.01); *G01C 21/3676* (2013.01)

(58) Field of Classification Search
CPC ............ G01C 21/3415; G01C 21/3676; G01C 21/3658; G06V 20/588; G06V 20/58
(Continued)

(56) References Cited

U.S. PATENT DOCUMENTS

2018/0149488 A1*   5/2018   Suto .................... G01C 21/3658
2018/0190122 A1*   7/2018   Guarneri ................ G08G 1/167
(Continued)

FOREIGN PATENT DOCUMENTS

CN        110103969 A  *  8/2019
CN        115158319 A      10/2022
(Continued)

OTHER PUBLICATIONS

International Search Report issued Jan. 24, 2024 in International Application No. PCT/CN2023/134641.
(Continued)

*Primary Examiner* — Muhammad Shafi
(74) *Attorney, Agent, or Firm* — Sughrue Mion, PLLC

(57)        ABSTRACT

A method for predicting a success rate of lane changing by a vehicle, including obtaining lane-group data of the plurality of lane groups, determining feature sets respectively corresponding to a plurality of lane lines of the traveling road, removing a feature subset in the plurality of feature subsets that meets a first preset condition from a feature set corresponding to the feature subset to obtain a remaining feature set, determining a current position offset of a traveling position of the vehicle in the plurality of lane groups during traveling of the vehicle, determining a target position offset of a preset target position of the vehicle in the plurality of lane groups, and predicting a success rate of changing from the first lane to the second lane by the vehicle based on the current position offset, the target position offset, the remaining feature set, and traveling information of the vehicle.

18 Claims, 10 Drawing Sheets

(58) Field of Classification Search
USPC ........................................................ 701/411
See application file for complete search history.

(56)                           References Cited

U.S. PATENT DOCUMENTS

2019/0095722 A1 *   3/2019  Kang ................... G06V 20/588
2019/0310100 A1 *  10/2019  Yang ................. G01C 21/3461

FOREIGN PATENT DOCUMENTS

CN           116977953  A      10/2023
EP              2059767  B1  *   7/2011    ......... G01C 21/3658
EP              3805073  A1  *   4/2021    ...... B60W 30/18163

OTHER PUBLICATIONS

Written Opinion of the International Searching Authority issued Jan.
24, 2024 in International Application No. PCT/CN2023/134641.

* cited by examiner

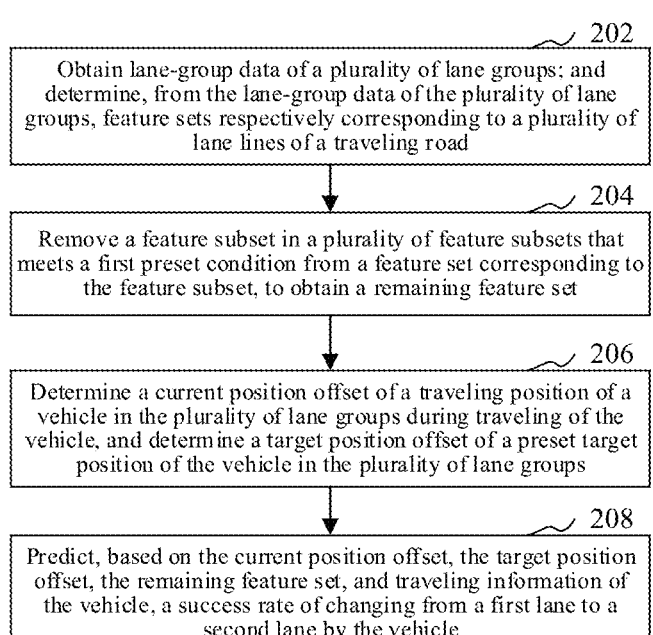

202

Obtain lane-group data of a plurality of lane groups; and determine, from the lane-group data of the plurality of lane groups, feature sets respectively corresponding to a plurality of lane lines of a traveling road

204

Remove a feature subset in a plurality of feature subsets that meets a first preset condition from a feature set corresponding to the feature subset, to obtain a remaining feature set

206

Determine a current position offset of a traveling position of a vehicle in the plurality of lane groups during traveling of the vehicle, and determine a target position offset of a preset target position of the vehicle in the plurality of lane groups

208

Predict, based on the current position offset, the target position offset, the remaining feature set, and traveling information of the vehicle, a success rate of changing from a first lane to a second lane by the vehicle

FIG. 2

| Lane group 1 | Lane group 2 | Lane group 3 |
|:---:|:---:|:---:|
| 1 | 1 | 1 |
| 2 | 2 | 2 |
| 3 | 3 | 3 |
| 0 | 50 | 100 |

FIG. 3A

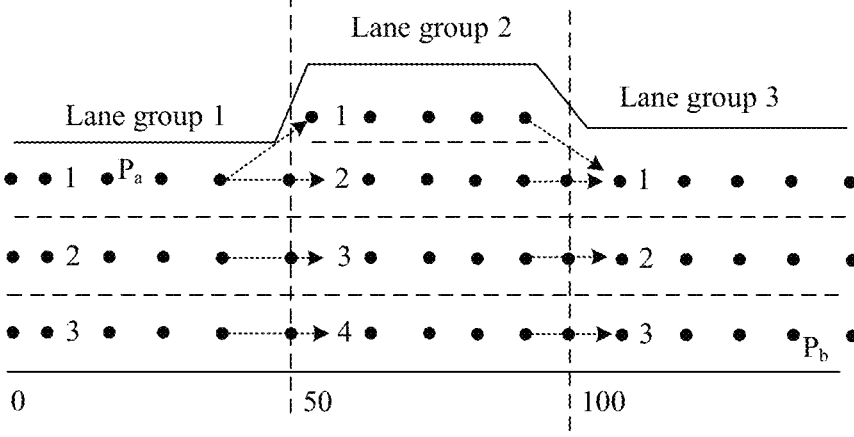

FIG. 3B

METHOD AND APPARATUS FOR PREDICTING SUCCESS RATE OF LANE CHANGING BY VEHICLE, COMPUTER DEVICE, AND STORAGE MEDIUM

CROSS-REFERENCE TO RELATED APPLICATIONS

This application is a continuation application of International Application No. PCT/CN2023/134641 filed on Nov. 28, 2023, which claims priority to Chinese Patent Application No. 202211514504.6, filed with the China National Intellectual Property Administration on Nov. 30, 2022, the disclosures of each being incorporated by reference herein in their entireties.

FIELD

The disclosure relates to the field of traffic technologies, and in particular, to a method and an apparatus for predicting a success rate of lane changing by a vehicle, a computer device, a storage medium, and a computer program product.

BACKGROUND

With the development of electronic map technologies, when driving a vehicle to travel, a traveling object may drive through navigation by using an electronic map, or drive in a manner in which an electronic map is combined with assisted driving or unmanned driving technologies.

In a process of driving the vehicle in the foregoing driving manner, a success rate of a lane change to a lane on a traveling road generally needs to be predicted, to travel to a destination safely and quickly. However, during actual traveling, prediction of the success rate of the lane change is generally affected by a plurality of factors. As a result, accuracy of a prediction result is low, and a safety hazard is consequently caused to traffic.

SUMMARY

Some embodiments provide a method for predicting a success rate of lane changing by a vehicle located on a traveling road comprising a plurality of lane groups, each lane group comprising lane road segments of a plurality of lanes, the method being performed by a computer device, and the method including obtaining lane-group data of the plurality of lane groups; determining, from the lane-group data of the plurality of lane groups, feature sets respectively corresponding to a plurality of lane lines of the traveling road, the feature sets each comprising a plurality of feature subsets corresponding to the plurality of lane groups, and each feature subset comprising a corresponding lane-line type and a line-segment offset; removing a feature subset in the plurality of feature subsets that meets a first preset condition from a feature set corresponding to the feature subset to obtain a remaining feature set; determining a current position offset of a traveling position of the vehicle in the plurality of lane groups during traveling of the vehicle, the traveling position being located on a first lane of the plurality of lanes; determining a target position offset of a preset target position of the vehicle in the plurality of lane groups, the preset target position being located on a second lane different from the first lane in the plurality of lanes; and predicting a success rate of changing from the first lane to the second lane by the vehicle based on the current position offset, the target position offset, the remaining feature set, and traveling information of the vehicle.

Some embodiments provide an apparatus for predicting a success rate of lane changing by a vehicle located on a traveling road comprising a plurality of lane groups, each lane group comprising lane road segments of a plurality of lanes, and the apparatus including: at least one memory configured to store computer program code; at least one processor configured to read the program code and operate as instructed by the program code, the program code comprising: extraction code configured to cause at least one of the at least one processor to obtain lane-group data of the plurality of lane groups; and determine, from the lane-group data of the plurality of lane groups, feature sets respectively corresponding to a plurality of lane lines of the traveling road, the feature sets each comprising a plurality of feature subsets corresponding to the plurality of lane groups, and each feature subset comprising a corresponding lane-line type and a line-segment offset; processing code configured to cause at least one of the at least one processor to remove a feature subset in the plurality of feature subsets that meets a first preset condition from a feature set corresponding to the feature subset, to obtain a remaining feature set; determining code configured to cause at least one of the at least one processor to determine a current position offset of a traveling position of the vehicle in the plurality of lane groups during traveling of the vehicle, the traveling position being located on a first lane on the plurality of lanes; and determine a target position offset of a preset target position of the vehicle in the plurality of lane groups, the preset target position being located on a second lane different from the first lane in the plurality of lanes; and judging code configured to cause at least one of the at least one processor to predict a success rate of changing from the first lane to the second lane by the vehicle based on the current position offset, the target position offset, the remaining feature set, and traveling information of the vehicle.

Some embodiments provide a non-transitory computer-readable storage medium storing computer code which, when executed by at least one processor, causes the at least one processor to at least: obtain lane-group data of a plurality of lane groups of a traveling road on which a vehicle is located, each lane group comprising lane road segments of a plurality of lanes; determine, from the lane-group data of the plurality of lane groups, feature sets respectively corresponding to a plurality of lane lines of the traveling road, the feature sets each comprising a plurality of feature subsets corresponding to the plurality of lane groups, and each feature subset comprising a corresponding lane-line type and a line-segment offset; remove a feature subset in the plurality of feature subsets that meets a first preset condition from a feature set corresponding to the feature subset to obtain a remaining feature set; determine a current position offset of a traveling position of the vehicle in the plurality of lane groups during traveling of the vehicle, the traveling position being located on a first lane of the plurality of lanes; determine a target position offset of a preset target position of the vehicle in the plurality of lane groups, the preset target position being located on a second lane different from the first lane in the plurality of lanes; and predict a success rate of changing from the first lane to the second lane by the vehicle based on the current position offset, the target position offset, the remaining feature set, and traveling information of the vehicle.

BRIEF DESCRIPTION OF THE DRAWINGS

To describe the technical solutions of some embodiments of this disclosure more clearly, the following briefly introduces the accompanying drawings for describing some embodiments. The accompanying drawings in the following description show only some embodiments of the disclosure, and a person of ordinary skill in the art may still derive other drawings from these accompanying drawings without creative efforts. In addition, one of ordinary skill would understand that aspects of some embodiments may be combined together or implemented alone.

FIG. 2 is a schematic flowchart of a method for predicting a success rate of lane changing by a vehicle according to some embodiments.

FIG. 3A is a schematic diagram of high definition data or lane-level data according to some embodiments.

FIG. 3B is a schematic diagram of high definition data or lane-level data according to another embodiment.

DESCRIPTION OF EMBODIMENTS

To make the objectives, technical solutions, and advantages of the present disclosure clearer, the following further describes the present disclosure in detail with reference to the accompanying drawings. The described embodiments are not to be construed as a limitation to the present disclosure. All other embodiments obtained by a person of ordinary skill in the art without creative efforts shall fall within the protection scope of the present disclosure.

In the following descriptions, related "some embodiments" describe a subset of all possible embodiments. However, it may be understood that the "some embodiments" may be the same subset or different subsets of all the possible embodiments, and may be combined with each other without conflict. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. For example, the phrase "at least one of A, B, and C" includes within its scope "only A", "only B", "only C", "A and B", "B and C", "A and C" and "all of A, B, and C."

In the following descriptions, the included term "first/second" is merely intended to distinguish similar objects but does not necessarily indicate a specific order of an object. The "first/second" is interchangeable in terms of a specific order or sequence if permitted, so that embodiments described herein can be implemented in a sequence in addition to the sequence shown or described herein.

Figure 1:
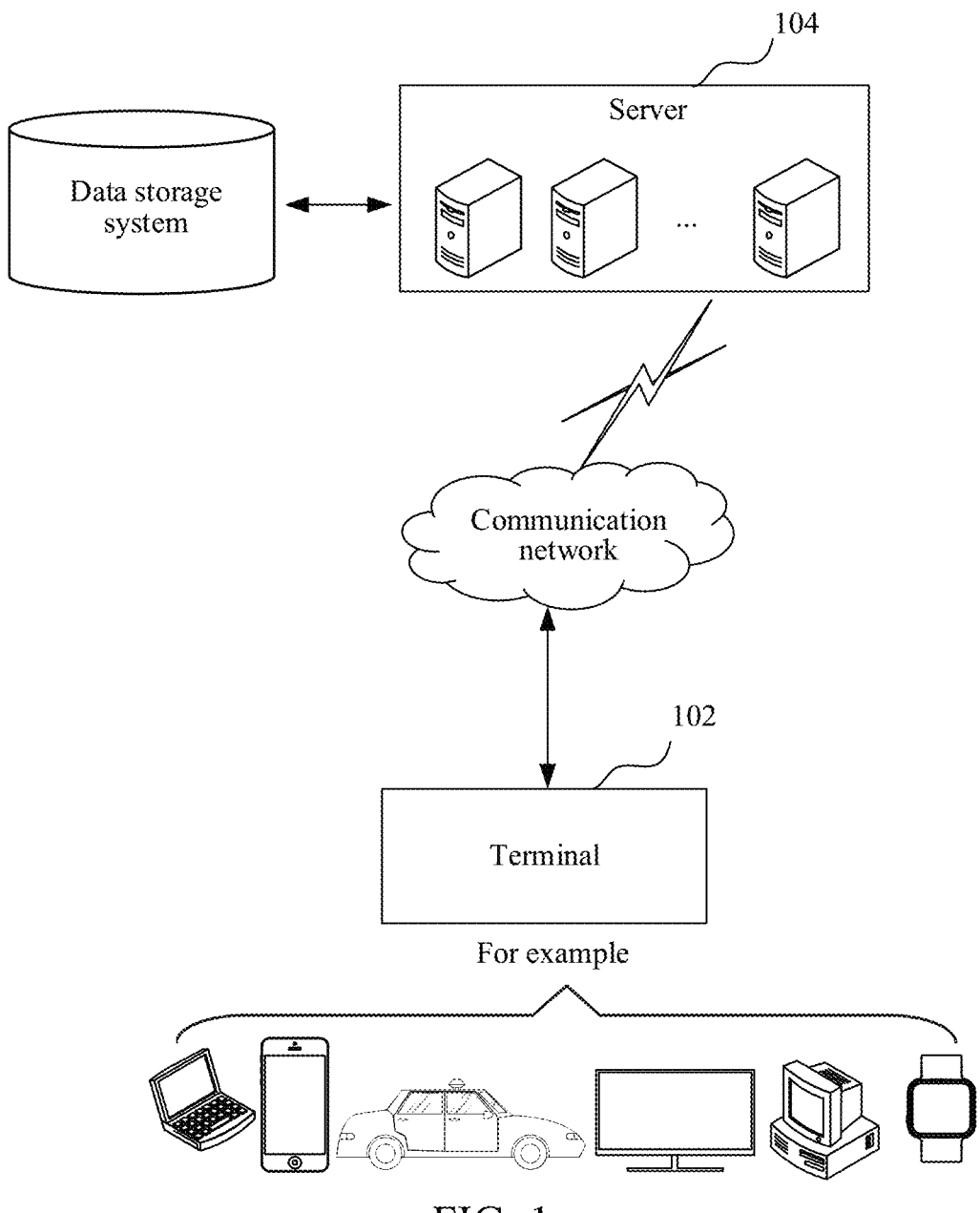
FIG. 1 is a diagram of an application environment of a method for predicting a success rate of lane changing by a vehicle according to some embodiments.

A method for predicting a success rate of lane changing by a vehicle provided in some embodiments may be applied to an application environment shown in FIG. 1. A terminal 102 communicates with a server 104 through a network. A data storage system may store data that the server 104 needs to process. The data storage system may be integrated on the server 104, or placed on a cloud or another network server.

The terminal 102 may be an electronic device on which an electronic map is installed, such as a smartphone, a tablet computer, a notebook computer, a desktop computer, a smart speaker, a smartwatch, an Internet of Things device, and a portable wearable device. The Internet of Things device may be a smart speaker, a smart in-vehicle device, a vehicle, or the like. The portable wearable device may be a smart watch, a smart band, a head-mounted device, or the like.

The server 104 may be an independent physical server, or a service node in a blockchain system. Each service node in the blockchain system forms a peer-to-peer (P2P) network. A P2P protocol is an application layer protocol running on top of a transmission control protocol (TCP).

In addition, the server 104 may further be a server cluster formed by a plurality of physical servers that may be a cloud server that provides basic cloud computing services such as a cloud service, a cloud database, cloud computing, a cloud function, cloud storage, a network service, cloud communication, a middleware service, a domain name service, a security service, a content delivery network (CDN), big data, and an AI platform.

The terminal 102 and the server 104 may be connected through a communication connection mode such as a Bluetooth, a USB (Universal Serial Bus), or a network, which is not limited herein.

In some embodiments, as shown in FIG. 2, a method for predicting a success rate of lane changing by a vehicle is provided. A vehicle is located on a traveling road. The traveling road includes a plurality of lane groups. Each lane group includes lane road segments of a plurality of lanes. Descriptions are provided by using an example in which the method is applied to the terminal 102 in FIG. 1. The method includes the following operations:

S202: Obtain lane-group data of a plurality of lane groups; and determine, from the lane-group data of the plurality of lane groups, feature sets respectively corresponding to a plurality of lane lines of a traveling road.

The vehicle may be a vehicle driven by a user on the traveling road, for example, may be various types of motor vehicles. The traveling road may be a road on which the vehicle travels, and may include an urban road and other types of roads, such as an expressway. The traveling road includes the plurality of lanes and the lane lines between the lanes. In addition, the traveling road further includes spacing lines between the lane and a traveling road environment, for example, edge lines located on both sides of the traveling road. The traveling road environment may be road environments on both sides of the traveling road, for example, green strips on both sides of the traveling road. The lane line between the lanes and the spacing line between the lanes and the traveling road environment may be considered as the lane line of the traveling road. In a map application, the vehicle may be represented in the form of a vehicle icon.

The lane-group data may be data for the lane group on the traveling road, and may include a quantity of lanes, a lane width, a lane-line type on the left and right of each lane and a corresponding lane line segment, a lane-line identifier (such as a name or number of a lane line), a lane-level connection relationship on and off of each lane, a lane center linear point, and the like. The plurality of lane groups may correspond to a plurality of pieces of lane-group data, that is, each lane group may correspond to a piece of lane-group data. Identifiers of a plurality of lane line segments included in the lane lines corresponding to the same lane-line identifier may be the same. In addition, the lane line segment in the same lane-group data may include lane line segments of one or more lane lines. For example, lane-group data may include a lane line segment of a lane line 1, a lane line segment of a lane line 2, a lane line segment of a lane line 3, and a lane line segment of a lane line 4. Therefore, the same lane-group data may include one or more lane-line types corresponding to the lane line segments.

The traveling road may include a plurality of lane groups, and the lane groups may form a lane group set. The lane group is a lane set corresponding to the lane-group data on the traveling road. Each lane group may include lane road segments of a plurality of lanes, and may further include lane line segments between the lane road segments. In addition, lane road segments and lane line segments between each adjacent lane group are aligned. For example, a first lane road segment (that is, a lane road segment numbered 1) in a lane group 1 and a first lane road segment in a lane group 2 belong to the same lane, as shown in FIG. 3A. A sequence of the lane road segments in the same lane group may be from left to right. In an actual traveling road, the lane group may be a lane set formed by lanes in a road of a corresponding length on the traveling road. Correspondingly, in the map application, the lane group may be a lane set formed lanes in a road image displayed on a map page. For example, if FIG. 3A is a road image displayed in the map application, the lane group may be a set formed by a lane 1, a lane 2, and a lane 3 in a road from 0 to 50.

The lane line segment may be a line segment with a specific length in the lane line, for example, a lane line segment with a length of 10 meters or 50 meters in the lane line. In addition, the lane line segment may have a corresponding line-segment offset. The line-segment offset may be an offset of the lane line segment in the lane group set. Specifically, the line-segment offset may be an offset between the lane line segment and a target point (for example, a start point or a traveling position of the vehicle) in the lane group set. A direction is from the target point to the start point of the lane line segment. A positive or negative sign may be used to represent the direction. A distance between the target point and the start point of the lane line segment is used to represent a magnitude of the offset. In some embodiments, the line-segment offset may include a start offset and an end offset. The start offset may be an offset of the start point of the lane line segment in the lane group set. The end offset may be an offset of an end point (that is, an endpoint) of the lane line segment in the lane group set. A difference between the end offset and the start offset is a length of the lane line segment. The foregoing lane-line type may be types of the lane lines, including a solid-line type, a dashed-line type, and a dashed and solid-line type. The solid-line type is that the lane line is a solid line. Therefore, the solid-line type may also be referred to as a solid line; the dashed-line type is that the lane line is a dashed line. Therefore, the dashed-line type may also be referred to as a dashed line; and the dashed and solid-line type may be that both a dashed line and a solid line exist between two adjacent lanes, and a lane line formed by the both the dashed line and the solid line is of the dashed and solid-line type. The lane-level connection relationship may be determined based on lane topology information. The lane group set may be a set formed by a plurality of lane groups, for example, a set formed by a lane group 1, a lane group 2, and a lane group 3 in FIG. 3b.

For the foregoing lane-group data, if there is a lane merging, a lane divergence (that is, a lane divides out of two lanes), or other cases in which a quantity of lanes changes in a segment of the traveling road near a current position of the vehicle, the lane-group data may be data obtained by performing lane reconstruction on original lane-group data of the traveling road. The original lane-group data is data corresponding to each original lane group on the traveling road. In addition, if there is no lane merging, lane divergence, or other cases in which the quantity of lane changes in the segment of the traveling road near the current position of the vehicle, the lane-group data may be the original lane-group data. The original lane-group data may be extracted from high definition (HD) data or lane-level data; the high definition data may be high definition road data, and may also be referred to as high definition map data; and the lane-level data may be lane-level road data, between standard definition (SD) road data and the high definition road data, that is, richer than the standard definition road data, but less rich than the high definition road data. The high definition data includes a road lane line equation, coordinates of a center linear point, a lane type, a lane marking line type, a lane width, a lane speed limit, lane topology information, coordinates of a utility pole, a position of a pointer, a position of a camera, a position of a traffic light, and the like. The lane-level data includes a road lane line equation, coordinates of a center linear point, a lane type, a lane marking line type, a lane width, a lane speed limit, lane topology information, and the like. For the center linear point, reference may be made to a small black point in FIG. 3b. In addition, in FIG. 3b, $P_a$ and $P_b$ are a traveling position and a target position of the vehicle respectively, and lane groups 1 to 3 are lane groups formed by lane road segments in the high definition data or the lane-level data.

A lane line feature may be a feature of the lane line on the traveling road, including the lane-line type of each lane line segment in the lane group and the line-segment offset of each lane line segment in the lane group. The line-segment offset may be an offset of the lane line segment, including the start offset and the end offset of the lane line segment. As shown in FIG. 3*b*, in the lane group 1 of the lane group set, the start offset of a lane line segment $$\text{line}^1_{right}$$

on a left side of a lane 1 is 0, and the end offset of is 50.

Each feature set includes a plurality of feature subsets corresponding to a plurality of lane groups. For example, a feature set may include feature subsets respectively corresponding to lane line segments in the plurality of lane groups that belong to the same lane line. Each feature subset includes a corresponding lane-line type and a line-segment offset. For example, a feature subset may be formed by a line-segment offset and a lane-line type corresponding to a lane line segment in a specific lane line. Since the line-segment offset may include the start offset and the end offset of the lane line segment, the feature subset may also be referred to as a triple feature subset or a triple. Each lane line has a corresponding feature set.

In some embodiments, the terminal may first obtain the traveling position and a preset target position of the vehicle, then determine a data range based on the traveling position and the preset target position, and then obtain original lane-group data or lane-group data within the data range from a map database. For example, the traveling position is used as a reference point and extends a target length (for example, 100 or 200 meters) in a direction opposite to a traveling direction to obtain a first position point. Then, the preset target position is used as the reference point and extends the target length in the traveling direction, to obtain a second position point, and finally, original lane-group data or lane-group data located between the first position point and the second position point is obtained. In addition, the terminal may also obtain original lane-group data or lane-group data located at the traveling position and the preset target position.

After obtaining the original lane-group data, the terminal may perform lane reconstruction on the original lane-group data to obtain the corresponding lane-group data. For example, quantities of lanes of two adjacent original lane groups are inconsistent (that is, not equal), at least one virtual lane is added to the original lane group with a smaller quantity of lanes, and a virtual lane width and a virtual lane-line type are configured for the virtual lane. For example, the virtual lane width is zero or half of an original lane width.

In addition to obtaining the original lane-group data, the terminal may also directly obtain the lane-group data of the plurality of lane groups; then, read, from the lane-group data, the lane-line type corresponding to the lane line segment of each lane line on the traveling road, and determine the line-segment offset of each lane line segment in the lane group; and combine the line-segment offsets and the lane-line types belonging to the same lane line to obtain the feature sets respectively corresponding to the lane lines.

Specifically, the lane-line types respectively corresponding to the plurality of lane line segments in the plurality of lane groups of the lane lines are read from the lane-group data of the plurality of lane groups, and the line-segment offsets of the plurality of lane line segments in the lane groups in which the plurality of lane line segments are located are determined; for each lane line segment, the feature subset respectively corresponding to each lane line segment are obtained by combining the lane-line type and the line-segment offset corresponding to the lane line segment; and for each lane line, the feature set corresponding to each lane line is obtained by combining the feature subsets corresponding to the lane line segments included in the lane line. When lane-line types in two adjacent feature subsets are the same, the two feature subsets may be combined into a feature subset.

Figures 4, 5:
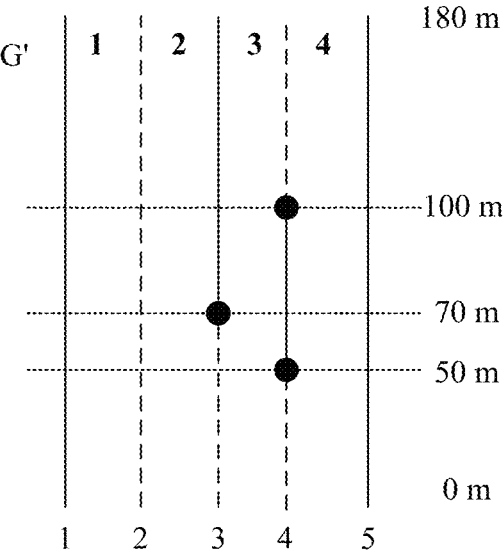
FIG. 4 is a schematic diagram in which a lane group is segmented and an offset is marked in the lane group according to some embodiments.
FIG. 5 is a schematic diagram in which an offset between a traveling position and a target position is marked in a lane group according to some embodiments.

For example, the lane-group data includes the lane-line type. Therefore, the lane-line type of the corresponding lane line segment may be read from the lane-group data, and then the lane-line type and the line-segment offset of the same lane line segment are combined to obtain the feature subset corresponding to the lane line segment. As shown in FIG. 4, a lane line 3 includes four lane line segments, and the feature subset corresponding to each lane line segment is (0, 50, dashed line), (50, 70, dashed line), (70, 100, solid line), and (100,180, solid line). In this case, two adjacent feature subsets of the same lane-line type may be combined into a feature subset, thereby obtaining a combined (0, 70, dashed line) and a combined (70,180, solid line) of the lane line 3. Then the two feature subsets are combined, thereby obtaining a feature set $$\text{Line}_3 = \text{line}^2_{right} = \text{line}^3_{left} = \{(0,\ 70,\ \text{dashed line}),\ (70,\ 180,\ \text{solid line})\}$$

of the lane line 3. Correspondingly, a feature set of a lane line 4 is $$\text{Line}_4 = \text{line}^3_{right} = \text{line}^4_{left} =$$
$$\{(0,\ 50,\ \text{dashed line}),\ (50,\ 100,\ \text{solid line}),\ (100,\ 180,\ \text{dashed line})\}.$$

$$\text{line}^2_{right} \text{ and } \text{line}^3_{left}$$

refer to a lane line on a right side of a lane 2 and a lane line on a left side of a lane 3 respectively. It can be seen from FIG. 4 that $$\text{line}^2_{right} \text{ and } \text{line}^3_{left}$$

all refer to Line₃, that is, the lane line 3. In addition, $$\text{line}^3_{right} \text{ and } \text{line}^4_{left}$$

refer to a lane line on a right side of the lane 3 and a lane line on a left side of a lane 4 respectively. It can be seen from FIG. 4 that $$\text{line}^3_{right} \text{ and } \text{line}^4_{left}$$

all refer to Line₄, that is, the lane line 4.

In some embodiments, the terminal determines a plurality of lane-line identifiers from the lane-group data of the plurality of lane groups, where the plurality of lane-line identifiers are respectively configured for uniquely identifying one of the plurality of lane lines; and reads, from the lane-group data of the plurality of lane groups, the lane-line types of the lane line segments corresponding to the same lane-line identifier.

The lane-line identifier may be a name or a number of the lane line.

For example, the terminal obtains a number of a lane line segment from the lane-group data of the plurality of lane groups, and then obtains a number of each lane line on the traveling road based on the number of the lane line segment. For example, in 10 pieces of lane-group data, there is a lane line segment with a number 1 in each piece of lane-group data. In this case, a number of a corresponding lane line may be obtained based on the numbers of the 10 lane line segments, that is, it may be determined that the lane line belongs to the lane line 1 (that is, a lane numbered 1). Then, for each lane line, the terminal may read, from the lane-group data of the plurality of lane groups, a lane-line type of each lane line segment of the lane line 1.

In some embodiments, the terminal determines the lane line on the traveling road based on the lane-group data; obtains the lane line segment in each lane group by performing line segment division on the lane line on the traveling road; and reads the lane-line type corresponding to each lane line segment from the lane-group data.

When line segment division is performed on the lane line on the traveling road, a plurality of lane groups may be obtained, so that the lane line segment in each lane group may be obtained.

The lane line segment may be a lane line of a specific length. For division of the lane lines, the following manner may be used: line segment division is performed on the lane line based on a change in the lane-line type. As shown in FIG. 4, at a position of the lane line 4 at 50 meters (m) from a start point, the lane-line type changes, that is, changes from a dashed line to a solid line. In this case, line segment division may be performed at the position 50 m from the start point. At a position of the lane line 3 at 70 m from the start point, the lane-line type changes, that is, changes from a dashed line to a solid line. In this case, line segment division may be performed at the position 70 m from the start point. In addition, at a position of the lane line 4 at 100 m from the start point, the lane-line type changes again, that is, changes from a solid line to a dashed line. In this case, line segment division may be performed at the position 100 m from the start point, thereby dividing the lane line into four segments.

S204: Remove a feature subset in a plurality of feature subsets that meets a first preset condition from a feature set corresponding to the feature subset, to obtain a remaining feature set.

The first preset condition may be that the lane-line type belongs to a non-changeable solid-line type. Therefore, the feature subset meeting the first preset condition may be that: the lane-line type and the line-segment offset in the feature subset are solid-line type and a line-segment offset of the lane line segment of the solid-line type respectively. As shown in FIG. 4, the lane-line type and the line-segment offset that meet the first preset condition may be a lane line feature of a lane line segment between 50 m and 100 m in the lane line 4, that is, a solid-line type and a line-segment offset of the lane line segment between 50 m and 100 m.

Removing may be filtering out, screening out, or deleting. For example, a feature subset meeting the first preset condition is deleted from each feature set, or a lane-line type and a line-segment offset in the feature subset meeting the first preset condition are deleted from each feature set.

In some embodiments, the terminal may remove, from the feature set, a feature subset meeting the first preset condition, to obtain a remaining feature set corresponding to the feature set and another feature set without removal. The remaining feature set corresponding to the feature set and the another feature set without removal may all be collectively referred to as a remaining feature set. Specifically, the terminal may remove, from the feature sets of all lane lines, a feature subset meeting the first preset condition, to obtain the remaining feature sets corresponding to all the feature sets in a one-to-one manner.

In some embodiments, after removing the feature subset meeting the first preset condition in the plurality of feature subsets from the corresponding feature set, the terminal may combine the remaining feature sets obtained based on lane line numbers on the traveling road, to obtain a feature set sequence. A sequence of the lane line numbers may be a sequence from left to right. For example, a leftmost lane line on the traveling road is numbered 1, and a second lane line on a left side of the traveling road is numbered 2, and so on. For lane group accompanying drawings corresponding to the feature set sequence, in consideration of traffic habits, a lane line of the solid-line type is retained in the related drawings. In some embodiments, the feature set sequence eliminates a feature corresponding to the lane line of the solid-line type. Therefore, the lane group corresponding to the feature set sequence does not include the lane line of the solid-line type.

In some embodiments, since the feature set includes the feature subset of each lane line segment in the lane line, and the feature subset includes the line-segment offset and the lane-line type of the lane line segment, when a removal operation is performed on the lane line feature, the terminal may first search, in each feature set, a target feature subset meeting the first preset condition, and then remove, in each feature set, the target feature subset, or remove a line-segment offset and a lane-line type in the target feature subset, to obtain the remaining feature set. For example, the remaining feature set does not include a lane-line type of the solid-line type and a corresponding line-segment offset. Finally, the terminal combines the remaining feature sets obtained after removal to obtain a feature set sequence.

For example, for feature sets of the lane lines in FIG. 4, a feature set of the lane line 1 is $Line_1=\{(0, 180, \text{solid line})\}$, a feature set of the lane line 2 is $Line_2=\{(0, 180, \text{dashed line})\}$, a feature set of the lane line 3 is $Line_3=\{(0, 70, \text{dashed line}), (70,180, \text{solid line})\}$, a feature set of the lane line 4 is $Line_4=\{(0, 50, \text{dashed line}), (50,100, \text{solid line}), (100,180, \text{dashed line})\}$, and a feature set of the lane line 5 is $Line_5=\{(0, 180, \text{solid line})\}$. The lane line features in which the lane lines in these feature sets are solid lines are removed, to obtain the remaining feature sets of the lane lines, that is: $Line_1=\text{empty set}$, $Line_2=\{(0, 180, \text{dashed line})\}$, $Line_3=\{(0, 70, \text{dashed line})\}$, $Line_4=\{(0, 50, \text{dashed line}), (100,180, \text{dashed line})\}$, and $Line_5=\text{empty set}$. Finally, the remaining feature sets of the lane lines are sorted and combined based on the sequence of the lane lines, to obtain a feature set sequence $Line=\{Line_1, Line_2, Line_3, Line_4, Line_5\}=\{\text{empty set}, \{(0, 180, \text{dashed line})\}, \{(0, 70, \text{dashed line})\}, \{(0, 50, \text{dashed line}), (100, 180, \text{dashed line})\}, \text{empty set}\}$.

After obtaining the feature set sequence, the terminal may select, from the feature set sequence, feature sets corresponding to lane lines located between the traveling position and the preset target position, and the selected feature sets may form a new feature set sequence, that is, a feature-set subsequence. When an empty set exists in the feature-set subsequence (that is, a feature set of a lane line in the feature-set subsequence is an empty set), and the first lane and the second lane are not the same lane, it represents that at least one solid line representing that a lane change is prohibited exists between the traveling position and the preset target position. Therefore, it may be determined that the vehicle cannot cross (that is, change lanes) from the first lane at which the traveling position is located to the second lane at which the preset target position is located. When an empty set does not exist in the feature-set subsequence, S206 is performed.

S206: Determine a current position offset of a traveling position of a vehicle in the plurality of lane groups during traveling of the vehicle, and determine a target position offset of a preset target position of the vehicle in the plurality of lane groups.

The traveling position is located in a first lane of the plurality of lanes. The traveling position may be a current positioning position of the vehicle, and the traveling position may also be referred to as a driving position. In addition, in some application scenarios, the traveling position may also be any position ahead in the traveling direction at which the success rate of lane changing by the vehicle needs to be predicted. The preset target position is located on a second lane of the plurality of lanes. The preset target position may be a position that needs to be passed through by the vehicle to lead to an endpoint position or an endpoint position to be reached. If the preset target position is the position that needs to be passed through to lead to the endpoint position, the preset target position may be determined on an obtained planned path after path planning is performed. The lane group is a lane set corresponding to the lane-group data on the traveling road. The first lane and the second lane may be different lanes. When the first lane and the second lane are different lanes, the first lane and the second lane may be adjacent lanes, or may be at least one lane apart.

The current position offset of the traveling position may be an offset at the plurality of lane groups, for example, an offset between a start point of a lane road segment (that is, a lane road segment at which the vehicle is located) in the plurality of lane groups of the traveling position and the traveling position. The target position offset may be an offset between the preset target position and a start point of a lane group in which the traveling position is located, for example, an offset between a start point of a lane road segment in the lane group in which the traveling position is located and the preset target position. For example, as shown in FIG. 5, $D_a$ is a current position offset of a traveling position $P_a$ in the lane group, $D_b$ is a target position offset of a preset target position $P_b$ in the lane group. The current position offset and the target position offset are vectors, positive and negative signs may be used to represent an offset direction, and a value may be used to represent an offset distance.

S208: Predict, based on the current position offset, the target position offset, the remaining feature set, and traveling information of the vehicle, a success rate of changing from a first lane to a second lane by the vehicle.

Figure 6:
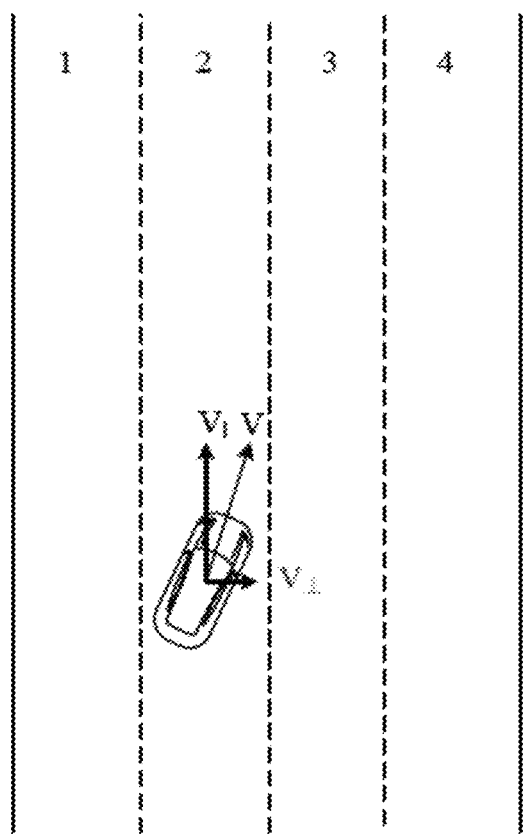
FIG. 6 is a schematic diagram in which a vehicle speed of a vehicle is disposed according to some embodiments.

The traveling information of the vehicle may include at least one of information such as a vehicle speed, an acceleration, traveling time, and braking information of the vehicle. When the traveling position is the current positioning position of the vehicle, the vehicle speed of the vehicle may be a speed at which the vehicle is currently traveling; and when the traveling position is any position ahead in the traveling direction at which the success rate of lane changing by the vehicle needs to be predicted, the vehicle speed of the vehicle may be a speed predicted based on a speed at which the vehicle is currently traveling. The vehicle speed of the vehicle may be decomposed into a parallel speed and a vertical speed relative to a lane, as shown in FIG. 6.

The success rate may be a success probability of changing from the first lane to the second lane. When the success rate is greater than or equal to a probability threshold, it represents that the lane can be changed from the first lane to the second lane; and when the success rate is less than the probability threshold, it represents that the lane cannot be changed from the first lane to the second lane. The probability threshold may be set based on an actual traffic safety situation, for example, may be set to 95%.

In some embodiments, when predicting the success rate of changing from the first lane to the second lane by the vehicle, the terminal may perform prediction with reference to two different vertical speeds. The two different vertical speeds include a first vertical speed and a second vertical speed. The first vertical speed may be a maximum vertical speed under conditions of complying with traffic regulations and traffic safety, and the second vertical speed may be a minimum vertical speed without affecting traveling of a rear vehicle. Therefore, first time (that is, minimum time) required for the lane change is calculated based on the first vertical speed, second time (that is, maximum time) required for the lane change is calculated based on the second vertical speed, and the first time and the second time are used as two different time thresholds (that is, a first time threshold and a second time threshold). Therefore, in a case that an empty feature set does not exist in the remaining feature set or the feature set sequence, when the vehicle needs to change lanes, the terminal may calculate lane change time based on an actual vertical vehicle speed of the vehicle. If the lane change time falls between the first time threshold and the second time threshold, it is predicted that the success rate of changing from the first lane to the second lane by the vehicle is great (for example, the success rate is greater than the probability threshold); if the lane change time is greater than the second time threshold, it is predicted that the success rate of changing from the first lane to the second lane by the vehicle is less; and if the lane change time is less than the first time threshold, it is predicted that the success rate of changing from the first lane to the second lane by the vehicle is less, and there may be a safety hazard.

In some embodiments, the terminal may determine a traveling distance of the vehicle based on the traveling information of the vehicle. Then, a forward position offset of the vehicle is determined based on the traveling distance and the current position offset of the traveling position, and the success rate of changing from the first lane to the second lane by the vehicle is predicted based on the forward position offset, the line-segment offset of each lane line segment in the remaining feature set, and the target position offset. In addition, considering that the remaining feature sets obtained after removing the feature subset meeting the first preset condition may be combined to obtain the feature set sequence, the terminal may further predict the success rate of changing from the first lane to the second lane by the vehicle based on the forward position offset, the line-segment offset of each lane line segment in the feature set sequence, and the target position offset.

The forward position offset may be a position offset after the vehicle travels forward.

The feature set sequence includes a feature-set subsequence between the first lane and the second lane. Therefore, when the success rate of lane changing by the vehicle is predicted, the success rate of changing from the first lane to the second lane by the vehicle is accurately and quickly calculated based on the forward position offset, the line-segment offset of each lane line segment in the feature-set subsequence, and the target position offset.

For example, the terminal determines the vehicle speed of the vehicle based on the traveling information, determines time consumption required to cross the lane based on the vertical speed corresponding to the vehicle speed and a lane width, determines the traveling distance of the vehicle based on the time consumption and a parallel vehicle speed corresponding to the vehicle speed, and predicts the success rate of changing from the first lane to the second lane by the vehicle based on the forward position offset, the line-segment offset of each lane line segment in the feature-set subsequence, and the target position offset.

During the prediction of the success rate of lane changing, the success rate of lane changing by the vehicle may also be predicted with reference to vehicle condition data of the traveling road. For example, the success rate of changing from the first lane to the second lane by the vehicle is predicted based on the vehicle condition data, the forward position offset, the line-segment offset of each lane line segment in the feature-set subsequence, and the target position offset, so that traffic safety can be effectively improved during traveling.

After the success rate of changing from the first lane to the second lane by the vehicle is predicted, a prediction result may be applied to the following two scenarios. Details are as follows:

Scenario 1: Perform path planning on a vehicle.

In some embodiments, when it is determined, based on the success rate, that the vehicle cannot cross from the first lane to the second lane, the terminal may re-plan a path to the preset target position, and then issue a new-path prompt, so that a user may be prompted to drive based on a re-planned path, which is beneficial to improving traffic safety.

Figure 7:
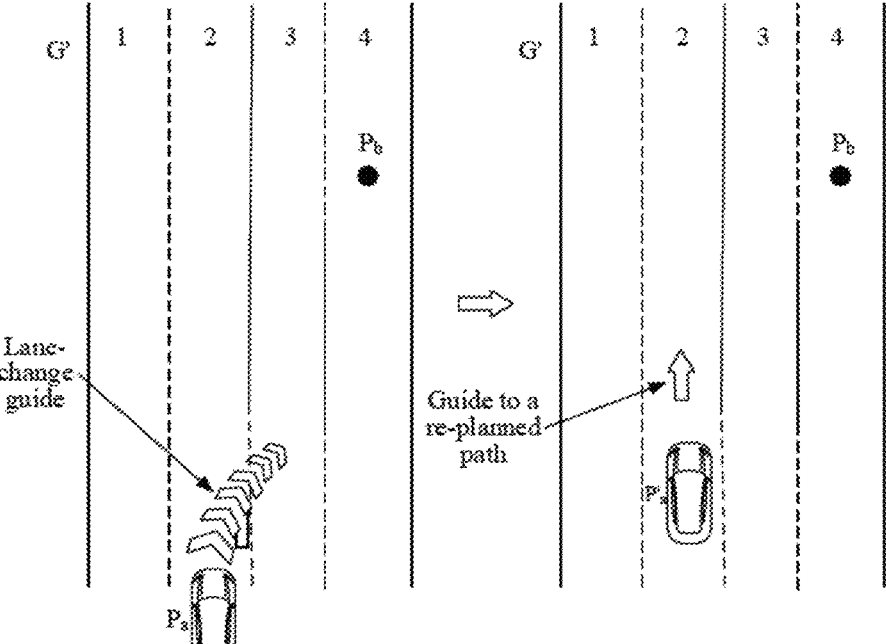
FIG. 7 is a schematic diagram in which a vehicle is prompted to change lanes and re-plan a path according to some embodiments.

For example, as shown in FIG. 7, it is assumed that a preset target position $P_b$ is a destination of the vehicle. When the vehicle is located at a traveling position $P_a$, it is determined, according to some embodiments, that the vehicle can gradually cross from the lane 2 to the lane 4. Since the vehicle does not change lanes in time at the traveling position $P_a$, when the vehicle travels to $P'_a$, it is determined, according to the technical solutions of some embodiments, that the vehicle cannot gradually cross from the lane 2 to the lane 4. Therefore, the path to the preset target position $P_b$ is re-planned, and a new-path prompt is issued, thereby avoiding a traffic safety risk caused by a forced lane change.

Scenario 2: Prompt a vehicle to change lanes.

In some embodiments, when it is determined that the vehicle can gradually cross from the first lane to the second lane based on the success rate, the terminal may display a lane-change guide on the electronic map, and prompt the user to change lanes based on the lane-change guide, so that the vehicle gradually crosses from the first lane to the second lane.

Figure 8:
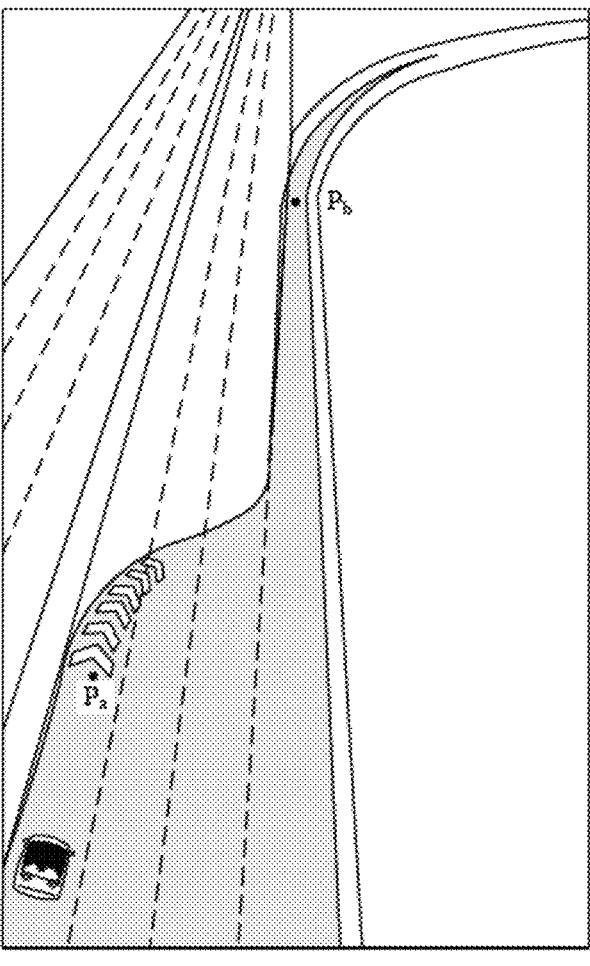
FIG. 8 is a schematic diagram in which a vehicle is prompted to change lanes according to some embodiments.

For example, as shown in FIG. 8, when it is determined, according to some embodiments, that the vehicle can gradually cross from the lane 2 to the lane 4 at the traveling position $P_a$, the terminal displays a lane-level lane-change guide on a navigation page of the electronic map, to prompt the user to change lanes based on the lane-level lane-change guide, which is beneficial to improving traffic safety.

In some embodiments, lane line feature extraction is performed on the lane-group data of the traveling road on which the vehicle is located, to obtain the feature set corresponding to each lane line. The feature subset meeting the first preset condition in the feature set is removed, to obtain the remaining feature set that does not include the feature subset meeting the first preset condition. Therefore, based on whether the remaining feature set is an empty set, and with reference to the remaining feature set and the traveling information of the vehicle, the current position offset, and the target position offset, the success rate of lane changing between different lanes when the vehicle travels can be quickly and accurately predicted. In addition, since the remaining feature set that does not include the feature subset meeting the first preset condition is obtained, even if the first lane at which the traveling position is located and the second lane at which the preset target position is located do not belong to the same lane, that the feature set corresponding to the lane line between the traveling position and the preset target position in the remaining feature set is empty can be used to quickly determine that the vehicle cannot travel from the first lane at which the traveling position is located to the second lane at which the preset target position is located. When the feature set in the remaining feature set is not empty, in a process of predicting the success rate of lane changing by the vehicle, considering the traveling information of the vehicle, the lane-line type, the current position offset of the traveling position of the vehicle, and the target position offset of the preset target position, the success rate of changing from the first lane to the second lane by the vehicle can be accurately predicted, thereby improving the accuracy of prediction of the success rate of lane changing by the vehicle, covering a wider application scenario, and effectively improving traffic safety.

Figure 9:
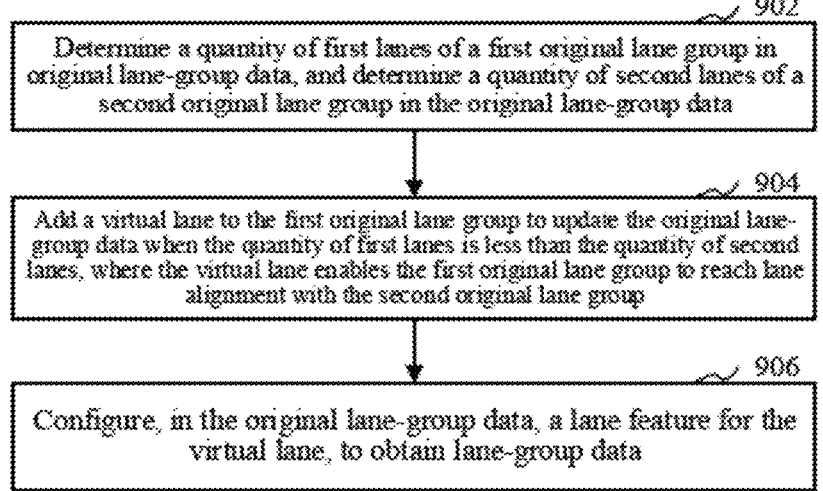
FIG. 9 is a schematic flowchart in which lane reconstruction is performed on original lane-group data according to some embodiments.

In some embodiments, the lane-group data is obtained by performing lane reconstruction on the original lane-group data of the traveling road, and the original lane-group data is data of each original lane group on the traveling road. Therefore, the terminal may perform lane reconstruction on the lane-group data. Lane reconstruction on the original lane-group data may be reconstructing (non-physical reconstruction) the original lane groups in the map application program corresponding to the original lane-group data. Considering that lane topology information is different between the original lane groups, lane reconstruction may be performed on the lane-group data in the following two manners. Details are as follows:

Manner 1: Expand an original lane group. As shown in FIG. 9, a specific expansion manner is as follows:

S902: Determine a quantity of first lanes of a first original lane group in original lane-group data, and determine a quantity of second lanes of a second original lane group in the original lane-group data.

The first original lane group and the second original lane group are lane groups that are adjacent to each other on the traveling road. The original lane-group data may include first original lane-group data and second original lane-group data. The first original lane-group data is lane-group data related to first original un-reconstructed lane-group data, and the second original lane-group data is lane-group data related to second original un-reconstructed lane-group data.

Figure 10:
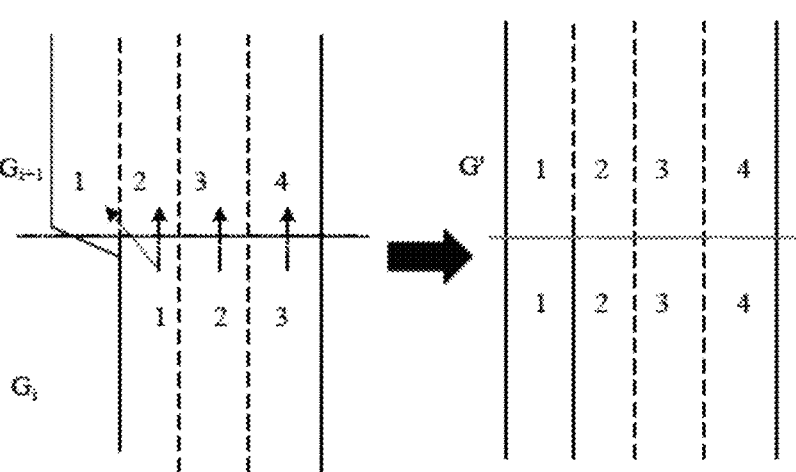
FIG. 10 is a schematic diagram in which lane reconstruction is performed on an original lane group according to some embodiments.

As shown in a road diagram on a left side of FIG. 10, a quantity of lanes of an original lane group $G_i$ is 3, a quantity of lanes of an original lane group $G_{i+1}$ is 4, and an edge lane on a left side of the original lane group $G_{i+1}$ and an edge lane on a left side of the original lane group $G_i$ are not on the same lane.

Figure 11:
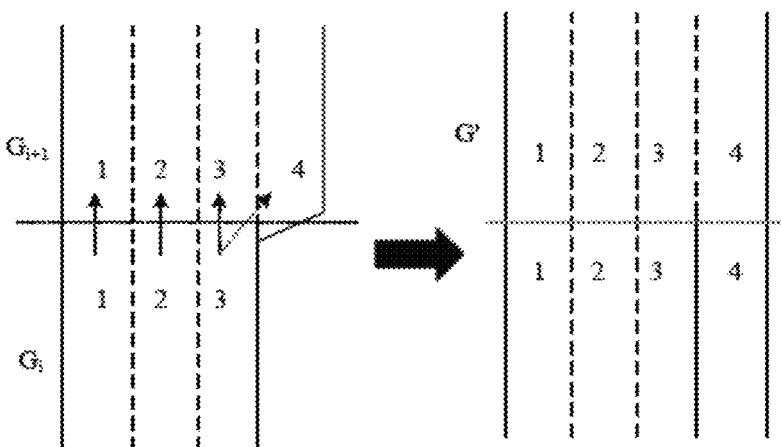
FIG. 11 is a schematic diagram in which lane reconstruction is performed on an original lane group according to another embodiment.

Further, as shown in a road diagram on a left side of FIG. 11, the quantity of lanes of the original lane group $G_i$ is 3, the quantity of lanes of the original lane group $G_{i+1}$ is 4, and an edge lane on a right side of the original lane group $G_{i+1}$ and an edge lane on a right side of the original lane group $G_i$ are not on the same lane.

Figure 12:
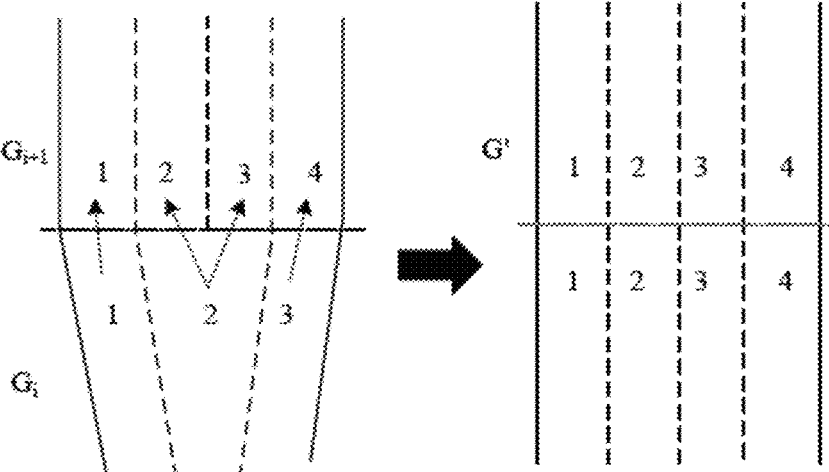
FIG. 12 is a schematic diagram in which lane reconstruction is performed on an original lane group according to another embodiment.

In addition, reference may also be made to a road diagram on a left side of FIG. 12. The quantity of lanes of the original lane group $G_i$ is 3, the quantity of lanes of the original lane group $G_{i+1}$ is 4, and two middle lanes of the original lane group $G_{i+1}$ are two lanes divided from a lane 2 of the original lane group $G_i$. FIG. 10 to FIG. 12 illustrate that the quantity of lanes of $G_i$ is less than the quantity of lanes of $G_{i+1}$. In addition, the quantity of lanes of $G_i$ may be greater than the quantity of lanes of $G_{i+1}$.

S904: Add a virtual lane to the first original lane group to update the original lane-group data when the quantity of first lanes is less than the quantity of second lanes, where the virtual lane enables the first original lane group to reach lane alignment with the second original lane group.

The added virtual lane may be a lane that does not exist in an actual traveling road. To conveniently and accurately predict the success rate of lane changing between different lanes by the vehicle, the virtual lane is added to a corresponding original lane group, so that a lane group for lane change success prediction may be obtained. Lane alignment may be alignment of a lane in the first original lane group with a corresponding lane in the second original lane group in an extending direction (that is, a traveling direction) on the traveling road, thereby ensuring that quantities of lanes are consistent (that is, equal) between adjacent lane groups. For example, as shown in a right image of FIG. 10, each lane in the lane group $G_i$ has a corresponding lane in the lane group $G_{i+1}$, and quantities of lanes in the lane groups are the same, that is, the lane group $G_i$ has four lane road segments, and an adjacent lane group $G_{i+1}$ of the lane road segments also has four lane road segments.

After the virtual lane is added to the first original lane group, the original lane-group data is correspondingly updated, that is, the virtual lane and an identifier of the virtual lane are newly added to the original lane-group data. In addition, data such as generation time and a storage position of the virtual lane may further be marked in the original lane-group data. Therefore, the original lane-group data after the foregoing data is newly added may be used as required lane-group data.

The addition of the virtual lane can be divided into the following two scenarios based on a position at which the virtual lane is added. Details are as follows:

Scenario a: Add a virtual lane at an edge of an original lane group.

In some embodiments, when the quantity of first lanes is less than the quantity of second lanes, and an edge lane road segment in the second original lane group and an edge lane road segment in the first original lane group are not on a same lane, the terminal adds, to the first original lane group, a virtual lane that is aligned with the edge lane road segment in the second original lane group.

The edge lane road segment alignment may be that the added virtual lane and the corresponding edge lane road segment in the second original lane group are in the same lane, that is, the lane topology information between the two lanes is connected.

For example, as shown in FIG. 10, since the quantity of lanes of the original lane group $G_i$ is less than the quantity of lanes of the original lane group $G_{i+1}$, a virtual lane is added to the left side of the original lane group $G_i$. Therefore, the quantity of lanes is consistent with the quantity of lanes of the original lane group $G_{i+1}$, so that a reconstructed lane group on a right side of FIG. 10 is obtained.

Further, as shown in FIG. 11, since the quantity of lanes of the original lane group $G_i$ is less than the quantity of lanes of the original lane group $G_{i+1}$, a virtual lane is added to the right side of the original lane group $G_i$. Therefore, the quantity of lanes is consistent with the quantity of lanes of the original lane group $G_{i+1}$, so that a reconstructed lane group on a right side of FIG. 11 is obtained.

Scenario b: Add a virtual lane in the middle of an original lane group.

In some embodiments, the terminal converts a middle lane road segment in the first original lane group into at least two virtual lanes respectively aligned with at least two lane road segments in the second original lane group when the quantity of first lanes is less than the quantity of second lanes and the middle lane road segment in the first original lane group is split into the at least two lane road segments in the second original lane group.

For example, as shown in FIG. 12, since the quantity of lanes of the original lane group $G_i$ is less than the quantity of lanes of the original lane group $G_{i+1}$, and the lane road segment 2 in the original lane group $G_i$ is split into the lane road segments 2 and 3 in the original lane group $G_{i+1}$, the lane road segment 2 in the original lane group $G_i$ is converted to two virtual lanes respectively aligned with the lane road segments 2 and 3 in the original lane group $G_{i+1}$, so that the quantity of lanes is consistent with the quantity of lanes of the original lane group $G_{i+1}$. Therefore, a reconstructed lane group on the right side of FIG. 12 is obtained.

The foregoing scenarios a and b illustrate that the quantity of lanes of $G_i$ is less than the quantity of lanes of $G_{i+1}$. In addition, the quantity of lanes of $G_i$ may be greater than the quantity of lanes of $G_{i+1}$. In this case, the following operations can be performed. A virtual lane is added to the left side of $G_{i+1}$, or a virtual lane is added to the right side of $G_{i+1}$. These two cases are similar to FIG. 10 and FIG. 11 respectively. A difference is that in FIG. 10 and FIG. 11, the quantity of lanes of $G_i$ is 3, and the quantity of lanes of $G_{i+1}$ is 4. In some embodiments, the quantity of lanes of $G_i$ is 4, and the quantity of lanes of $G_{i+1}$ is 3. In some embodiments, the lane to be expanded in the middle of $G_{i+1}$ is replaced with two virtual lanes. This case is similar to FIG. 12. A difference is that in FIG. 12, the quantity of lanes of $G_i$ is 3, the quantity of lanes of $G_{i+1}$ is 4, the lane 2 in $G_i$ is split into two lanes (such as the lane 2 and the lane 3 in $G_{i+1}$) in $G_{i+1}$. In some embodiments, the quantity of lanes of $G_i$ is 4, the quantity of lanes of $G_{i+1}$ is 3, and the lane 2 and the lane 3 of $G_i$ merge into one lane in $G_{i+1}$.

S906: Configure, in the original lane-group data, a lane feature for the virtual lane, to obtain lane-group data.

The lane feature includes a lane width and a corresponding lane-line type. When the lane feature is configured, the lane feature may be configured for the virtual lane in the updated original lane-group data.

For the case of the scenario a above, after the virtual lane is added, the terminal may further configure a first virtual lane width and a first virtual lane line for the virtual lane in the original lane-group data. The first virtual lane line is a lane line that belongs to a solid-line type and that represents that a lane change is prohibited, and the first virtual lane width is equal to a target width value.

After the virtual lane is added, to ensure that the entire lane width of the segment of traveling road is unchanged, the lane width of the virtual lane may be set to 0. In addition, considering that the added virtual lane does not have a corresponding lane on an actual traveling road, it is not possible to travel on the virtual lane and change lanes to the virtual lane. Therefore, the lane line corresponding to the virtual lane is set to a solid line, that is, the lane-line type is the solid-line type.

For the case of the foregoing scenario b, after the virtual lane is added, the terminal may further configure a second virtual lane line of a dashed-line type between the at least two virtual lanes; and configure, in the original lane-group data, second virtual lane widths respectively for the at least two virtual lanes, where a sum of the second virtual lane widths of the at least two virtual lanes is consistent with a lane width of the middle lane road segment in the first original lane group.

After the virtual lane is added, to ensure that the entire lane width of the segment of traveling road is unchanged, the lane widths of the two virtual lanes in FIG. 12 may be respectively set to half of the lane width of the original lane. In addition, considering that the two virtual lanes are actually one lane, a lane line of a dashed-line type is set between the two virtual lanes.

In some embodiments, lane reconstruction is performed on lane road segments that are not aligned, so that the lanes between the lane groups are aligned after reconstruction, which can facilitate prediction of the success rate of lane changing between different lanes by the vehicle. In addition, during calculation, logical judgment of the quantity of lanes in different lane groups is avoided. Therefore, during autonomous driving (or assisted driving), a calculation speed can be effectively improved, and the calculation efficiency can be improved. In addition, the code complexity is effectively reduced and the code reusability is improved in a development stage.

Manner 2: Straight out a curved original lane group.

In some embodiments, the lane-group data is obtained by performing lane reconstruction on the original lane-group data of the traveling road, and the original lane-group data is the data of each original lane group on the traveling road. Therefore, the terminal may obtain the original lane-group data of the traveling road; and convert the original lane group in the original lane-group data into a lane group of a straight-line type when the original lane group in the original lane-group data is a lane group with a curvature.

Figure 13:
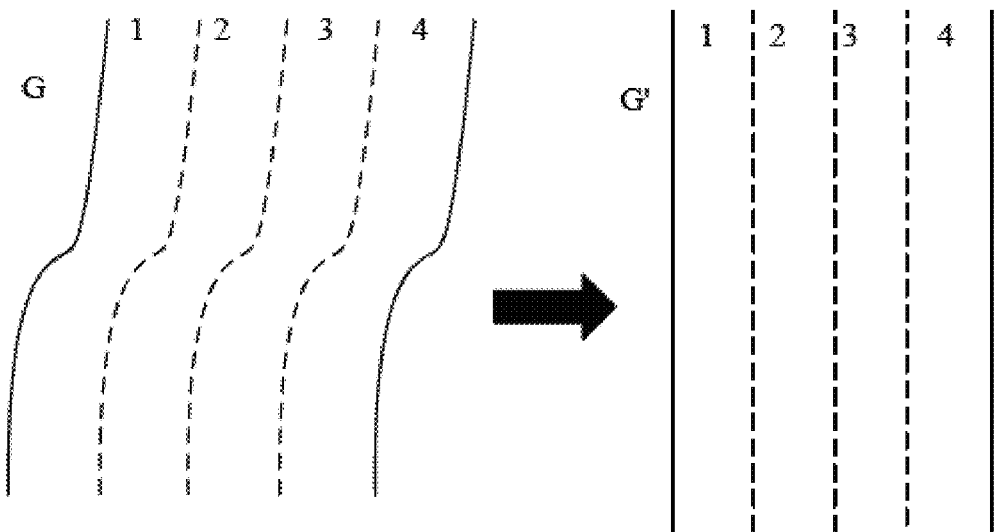
FIG. 13 is a schematic diagram in which lane reconstruction is performed on an original lane group according to another embodiment.

The curvature may be a curvature degree of the original lane group. For example, as shown in FIG. 13, when the original lane group is a curved lane group, the originally curved original lane group is converted into a straight lane group.

In some embodiments, the original lane group that is originally curved is converted into a straight lane group, which facilitates time consumption calculation required for lane changing. In other words, there is no need to consider a curvature in a calculation process. In this way, the prediction of the success rate of lane changing between different lanes by the vehicle can be facilitated, the code complexity can be effectively reduced, and the code reusability can be improved.

Figure 14:
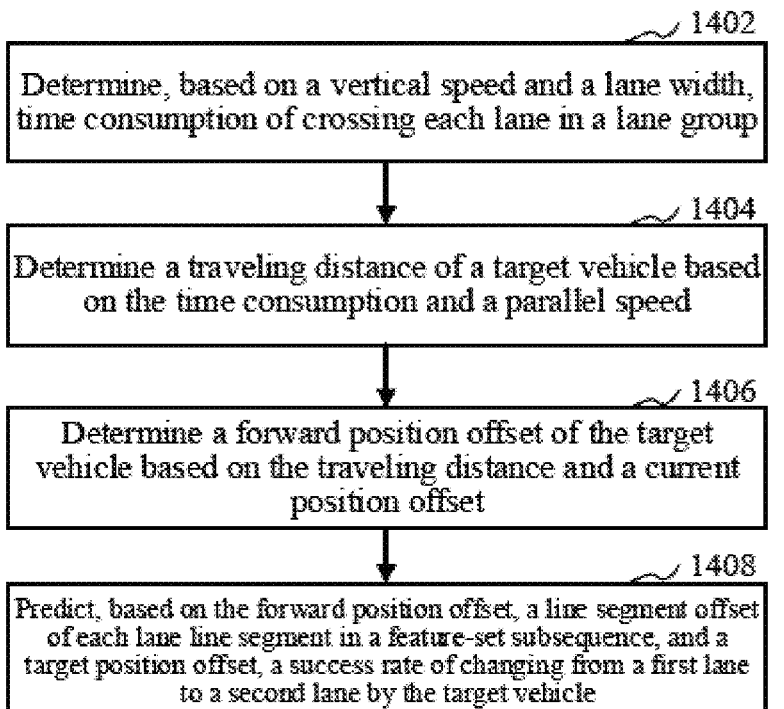
FIG. 14 is a schematic flowchart in which a success rate of lane changing by a vehicle is predicted according to some embodiments.

In some embodiments, the vehicle speed of the vehicle includes a parallel speed and a vertical speed relative to a lane; and the feature set sequence includes a feature-set subsequence between the first lane and the second lane. Therefore, for prediction of the success rate of lane changing between the first lane and the second lane by the vehicle, as shown in FIG. 14, a specific method may include the following operations.

S1402: Determine, based on a vertical speed and a lane width, time consumption of crossing each lane in a lane group.

The crossing each lane in the lane group may be time consumption for the vehicle to change from one lane to another lane in the lane group.

In the original lane group, the lane width of each lane usually ranges from 3.5 m to 3.75 m. In a subsequent embodiment, it is assumed that the lane width is 3.5 m. Since the lane group obtained after reconstruction includes the virtual lane, the lane width may be 0, 3.5/L, or 3.5. n is a quantity of virtual lanes added to the middle of the original lane group. When the lane width is 0, it represents that the virtual lane is added to an edge of the original lane group; when the lane width is 3.5/L, it represents that L virtual lanes are added to the middle of the original lane group; and when the lane width is 3.5, it represents that no virtual lane is added to the original lane group.

As shown in FIG. 6, the terminal may use a vertical speed $V_{\perp}$ of the vehicle and the lane width to calculate time consumption/for crossing each lane in the lane group. During calculation of the time consumption t, considering that the vehicle changes from one lane to another lane, when the vehicle changes from the lane 2 to the lane 3, the time consumption is $$t = \frac{[(w_2 + w_3)/2]}{V_{\perp}}.$$

$w_2$ is a lane width of the lane 2, and $w_3$ is a lane width of the lane 3.

S1404: Determine a traveling distance of a target vehicle based on the time consumption and a parallel speed.

For example, in a process of crossing a lane, the vehicle may simultaneously travel forward. In this case, a distance the vehicle travels forward can be calculated based on the time consumption/and a parallel vehicle speed $V_{\parallel}$.

S1406: Determine a forward position offset of the target vehicle based on the traveling distance and a current position offset.

In some embodiments, the terminal calculates a sum of the traveling distance and the current position offset, and then uses the sum as the forward position offset of the vehicle.

S1408: Predict, based on the forward position offset, a line segment offset of each lane line segment in a feature-set subsequence, and a target position offset, a success rate of changing from a first lane to a second lane by the vehicle.

In some embodiments, the current position offset of the traveling position of the vehicle in the lane group is determined, and the target position offset of the preset target position in the lane group is determined. The lane group is a lane set corresponding to the lane-group data that is on the traveling road. Therefore, for prediction of the success rate of lane changing by the vehicle, comprehensive calculation may be performed by using the current position offset, the target position offset, the feature-set subsequence, the vehicle speed of the vehicle, and the lane width. In consideration of the vehicle speed, the lane width, the lane-line type, the current position offset, and the target position offset, the success rate of crossing from the first lane to the second lane by the vehicle can be accurately calculated, the accuracy of the success rate of lane changing when the vehicle changes lanes is improved, and the covered application scenarios are wider, which effectively improves traffic safety.

Figure 15:
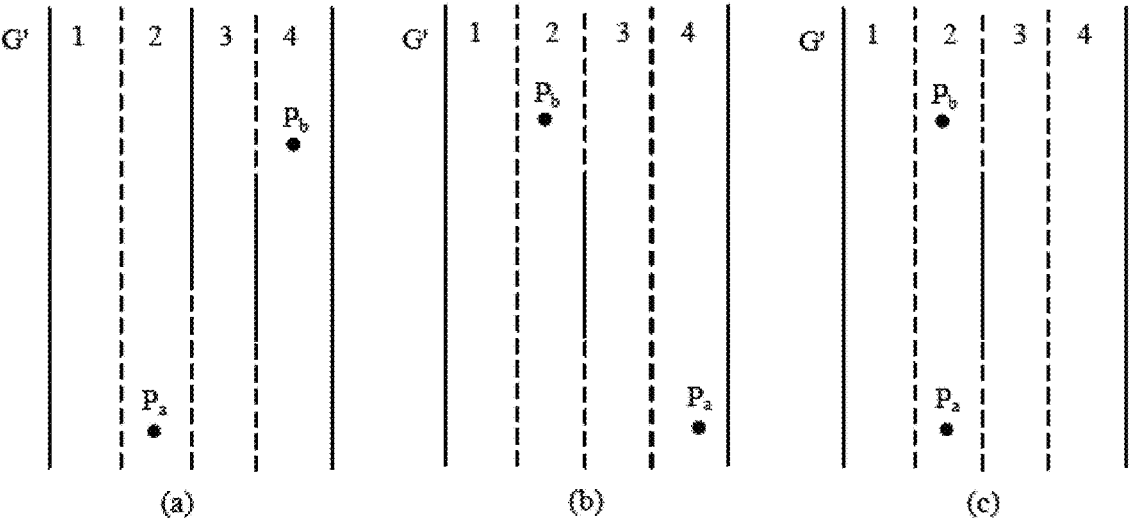
FIG. 15 is a schematic diagram of a positional relationship between lanes in which a traveling position and a target position are located according to some embodiments.

It is considered that the first lane in which the vehicle is located may be located on the left side of the second lane, as shown in (a) of FIG. 15. In addition, the first lane in which the vehicle is located may also be located on the right side of the second lane, as shown in (b) of FIG. 15; and the first lane in which the vehicle is located may also be located in the same lane as the second lane (that is, the vehicle changes lanes to another lane, and then changes lanes back to the first lane), as shown in (c) of FIG. 15. Therefore, during prediction of the success rate of lane changing by the vehicle, the following several scenarios may be divided for descriptions. Details are as follows.

Scenario 1: A first lane in which a vehicle is located is located on a left side of a second lane.

In some embodiments, the line-segment offset includes an end offset, and a quantity of lane lines in the feature-set subsequence (that is, a quantity of all lane line segments in the feature-set subsequence) is n, n being a positive integer not less than 1. Therefore, the terminal traverses, in an $i^{th}$ lane line in the feature-set subsequence, the feature subset of each lane line segment in a traveling direction of the vehicle, to obtain a traversal result; determines that a target feature subset meeting a second preset condition exists in the traversal result, where the second preset condition is that the forward position offset is not greater than an end offset corresponding to the $i^{th}$ lane line and not greater than the target position offset; and performs increment processing on i based on a preset step, and cyclically performs the foregoing operations (that is, each operation in this embodiment) until i=n, and when the target feature subset meeting the second preset condition exists in the traversal result of the $i^{th}$ lane line, determines that the vehicle is capable of changing from the first lane to the second lane. In addition, it is determined that the vehicle is not capable of changing from the first lane to the second lane when it is determined that the target feature subset meeting the second preset condition does not exist in the traversal result. Therefore, through some embodiments, even if the first lane in which the vehicle is located and the second lane in which the preset target position is located do not belong to the same lane, and the first lane and the second lane are adjacent lanes or separated by a plurality of lanes, the success rate of lane changing between the first lane and the second lane by the vehicle can be quickly and accurately calculated.

For example, as shown in FIG. 15(*a*), descriptions are made with reference to pseudo code. Details are as follows.

```
Initialize a variable ForwardDis=D_a;
//Traverse L lines between P_a and P_b
For (int i = 1; i <= L; i++) {
//An i^th line corresponds to a lane crossing an (A+i-1)^th lane
(1) Use W_i to represent a lane width of the (A+i-1)^th lane;
```

(2) Minimum time to cross the lane is $t_i = \dfrac{W_i}{V_\perp^{max}}$;

```
(3) A distance of forward movement of a vehicle during time to cross
the lane is d_i = V_∥ * t_i;
(4) In this case, ForwardDis=ForwarDis+d_i;
(5) Forward traverse all triples (start, end, type) in Line_i to find a lane
line meeting the following conditions:
1> If start ≤ ForwardDis ≤ end, ForWardDis remains unchanged, and
exit a traversal process;
2> if ForwardDis ≤ start, ForWardDis=start and exit the traversal pro-
cess;
if there is no triple meeting 1> and 2>, returning A-B is not passable and
exit an algorithm
```

```
}
if (ForwardDis ≤ D_b){
Returning A-B is passable
} else
```

{Returning A-B is impassable}

The foregoing A and B are respectively lanes in which $P_a$ and $P_b$ are located.

Scenario 2: A first lane in which a vehicle is located is located on a right side of a second lane.

In some embodiments, the terminal obtains a traversal result by traversing, in an $i^{th}$ lane line corresponding to the feature-set subsequence, the feature subset of each lane line segment in a traveling direction of the vehicle; determines that a target feature subset meeting a second preset condition exists in the traversal result, where the second preset condition is that the forward position offset is not greater than an end offset corresponding to the $i^{th}$ lane line and not greater than the target position offset; and performs decrement processing on i based on a preset step, and cyclically performs the foregoing operations until i=1, and when the target feature subset meeting the second preset condition exists in the traversal result of the $i^{th}$ lane line, determines that the vehicle is capable of changing from the first lane to the second lane. In addition, it is determined that the vehicle is not capable of changing from the first lane to the second lane when it is determined that the target feature subset meeting the second preset condition does not exist in the traversal result. Therefore, through some embodiments, even if the first lane in which the vehicle is located and the second lane in which the preset target position is located do not belong to the same lane, and the first lane and the second lane are adjacent lanes or separated by a plurality of lanes, the success rate of lane changing between the first lane and the second lane by the vehicle can be quickly and accurately calculated.

For a case that the first lane in which the vehicle is located is located on the right side of the second lane, reference may be made to the foregoing scenario 1 and FIG. 15(*b*).

Scenario 3: A first lane and a second lane in which a vehicle is located belong to the same lane.

Particularly, when the first lane and the second lane belong to the same lane, the terminal may directly determine, based on the forward position offset, the line-segment offset of each lane line segment in the feature set sequence (or the feature-set subsequence), and the target position offset, that the vehicle may cross from the first lane to the second lane, so that the success rate of lane changing by the vehicle can be quickly calculated.

As an example, descriptions are provided herein with reference to FIG. 3*b*, FIGS. 4 to 7, FIGS. 10 to 13, and FIG. 16. Details are as follows.

(1) Obtain a vehicle speed, a start position, and a preset target position of a vehicle.

A start position $P_a$ (lon, lat) and a preset target position$P_b$ (lon, lat) of the vehicle are obtained, where lon and lat respectively represents a longitude and a latitude. $P_a$ may be a current positioning position of the vehicle, or may be any start position that needs to be judged.

In addition, a vehicle speed V of the vehicle is further obtained. The vehicle speed V may be a real traveling speed of the vehicle, or may be any preset speed, or a speed predicted based on the real traveling speed of the vehicle.

(2) Obtain original lane-group data.

All high definition data or lane-level data between $P_a$ and $P_b$ is obtained, as shown in FIG. 3*b*; and then, lane-group data including $P_a$ and $P_b$ is obtained from the high definition data or the lane-level data, and the lane-group data includes: a plurality of original lane groups, a quantity of lanes recorded by each lane group, lane-line types on the left and right of each lane and corresponding intervals thereof, a lane-level connection relationship on and off of each lane, a lane-level center linear point, a lane width, and the like.

If the high definition data and the lane-level data are missing between $P_a$ and $P_b$, subsequent calculation cannot be performed. In this case, the lane crossing trafficability (which can be measured by the success rate of lane changing by the vehicle) judges that the process is terminated.

(3) Convert an original lane group.

The lane-group data between $P_a$ and $P_b$ includes a plurality of lane groups, denoted as $G=\{G_1, G_2, \ldots, G_n\}$, and the quantity of lanes of each lane group may change, which is not conducive to calculation. Therefore, all original lane groups are spliced into a new virtual lane group G' for subsequent calculation. Specific operations are as follows.

For all lane groups, adjacent lane groups $G_i$ and $G_{i+1}$ are reconstructed until all lane groups are reconstructed to obtain a complete lane group G'.

Generally, it is assumed that now reconstruction from $G_1$ to $G_i$ is completed, and $G_i'$ is obtained. A method for reconstructing $G_i'$ and $G_{i+1}$ is described below. All possibilities are classified and discussed as follows.

Scenario 1: As shown in FIG. 10, a lane is expanded on the left side of $G_{i+1}$. In this case, a virtual lane may be added to the left side of $G_i$. A left lane-line type of the virtual lane is an edge solid line, and a right side is a solid line. The virtual lane cannot be reached according to traffic regulations, but is an occupancy lane. A lane width of the virtual lane may be set to 0 (only to logically generate a lane to ensure that a road width is unchanged), so that a lane group G' on the right side of FIG. 10 is obtained. Similarly, for a case that n lanes are expanded on the left side, n virtual lanes are added to the left side.

Scenario 2: As shown in FIG. 11, a lane is expanded on the right side of $G_{i+1}$. In this case, a virtual lane may be added to the right side of $G_i$. A right lane-line type of the virtual lane is an edge solid line, and a left side is a solid line. The virtual lane cannot be reached according to traffic regulations, but is an occupancy lane. A lane width of the virtual lane may be set to 0, so that a lane group G' on the right side of FIG. 11 is obtained. Similarly, for a case that n lanes are expanded on the right side, n virtual lanes are added to the left side.

Scenario 3: As shown in FIG. 12, a lane is expanded in the middle of $G_{i+1}$. In this case, the lane to be expanded in the middle of $G_i$ may be replaced with two virtual lanes (for example, a lane 2 on the left side of FIG. 12 is replaced with virtual lanes 2 and 3 on the right side). Left and right lane-line types of the virtual lane are dashed lines, representing that the two lanes may be connected. Lane widths of the two virtual lanes are half of the original lane width, and a lane group G' on the right side of FIG. 12 is obtained. Similarly, in a case that m lanes are expanded in the middle, the expanded lanes are replaced with m virtual lanes, left and right lane lines of each virtual lane are dashed lines, and a lane width of each virtual lane is set to 1/m of the original lane width.

The foregoing scenarios 1 to 3 illustrate that the quantity of lanes of $G_i$ is less than the quantity of lanes of $G_{i+1}$. In addition, the quantity of lanes of $G_i$ may be greater than the quantity of lanes of $G_{i+1}$. In this case, the following operations can be performed. A virtual lane is added to the left side of $G_{i+1}$, or a virtual lane is added to the right side of $G_{i+1}$. These two cases are similar to FIG. 10 and FIG. 11 respectively. A difference is that in FIG. 10 and FIG. 11, the quantity of lanes of $G_i$ is 3, and the quantity of lanes of $G_{i+1}$ is 4. In some embodiments, the quantity of lanes of $G_i$ is 4, and the quantity of lanes of $G_{i+1}$ is 3. In some embodiments, the lane to be expanded in the middle of $G_{i+1}$ is replaced with two virtual lanes. This case is similar to FIG. 12. A difference is that in FIG. 12, the quantity of lanes of $G_i$ is 3, the quantity of lanes of $G_{i+1}$ is 4, the lane 2 in $G_i$ is split into two lanes (such as the lane 2 and the lane 3 in $G_{i+1}$) in $G_{i+1}$. In some embodiments, the quantity of lanes of $G_i$ is 4, the quantity of lanes of $G_{i+1}$ is 3, and the lane 2 and the lane 3 of $G_i$ merge into one lane in $G_{i+1}$. When lane feature configuration is performed on the virtual lane, reference may be made to the foregoing scenarios 1 to 3.

Based on the foregoing reconstruction manner, all $G_1$, $G_2, \ldots, G_n$ between $P_a$ and $G_1, G_2, \ldots, G_n$ are reconstructed to obtain a new lane group G'.

If the lane group is a lane group with a curvature, the lane group may be converted into a straight lane group based on a length of a center line of the lane, as shown in FIG. 13.

(4) Predict a success rate of lane changing from $P_a$ to $P_b$.

After the new lane group G' is obtained, the lane group G' includes a lane line feature set and width information of each lane i. Each lane line feature set may include a triple (start, end, type) corresponding to each lane line. start and end respectively represent an offset of a start point and an end point of each lane line relative to a start point of the lane group G' (that is, a start offset and an end offset). type records a line type. As shown in FIG. 4, it can be obtained that:

$$line_{right}^2 = line_{left}^3 = \{(0, 70, \text{dashed line}), (70, 180, \text{solid line})\}$$

$$line_{right}^3 =$$

$$line_{left}^4 = \{(0, 50, \text{dashed line}), (50, 100, \text{solid line}), (100, 180, \text{dashed line})\}$$

As shown in FIG. 15, FIG. 15 shows three possible relative relationships between $P_a$ and $P_b$. A number of a lane at which $P_a$ is located is denoted as A, and a number of a lane at which $P_b$ is located is denoted as B. There are three cases: >, <, and =. < represents that $P_b$ is on the right side of $P_a$, corresponding to (a) in FIG. 15; > represents that $P_b$ is on the left side of $P_a$, corresponding to (b) in FIG. 15; and =represents that $P_a$ and $P_b$ are in the same lane, corresponding to (c) in FIG. 15.

1. For A=B, further judgment is not required, and it is directly determined that the vehicle can pass from A to B.

2. For A<B, first, features of L lane lines that need to be crossed from the lane A to the lane B are obtained, where L=B−A. Each lane line includes a triple, the triple is deleted, and only a part of each Line type-dashed line (or a double line type of left solid and right dashed, representing that the line can be crossed) is retained, to obtain a feature set sequence Line:

$$\text{Line} = \{\text{Line}_1, \ldots, \text{Line}_L\}$$

1 to L is a lane line crossing sequence in which the vehicle travels from the lane A to the lane B. If there is a specific set Line; is empty, it represents that there is a lane line that cannot be crossed, and a direct return to A to B cannot be passed (that is, the vehicle cannot change from the lane A to the lane B).

If all Line$_i$ are not empty, next judgment is made:

A vehicle speed V may be decomposed into a component parallel to a lane line V$_\parallel$ (a parallel speed for short) and a component V$_\perp$ perpendicular to a lane line (a vertical speed for short), as shown in FIG. 6. To ensure traffic safety, V$_\perp$ is to be as small as possible to ensure that the vehicle smoothly crosses the lane. Therefore, a maximum vertical speed $$V_\perp^{max}$$

may be set. For example, the lane width is W, and it may be assumed that a minimum of 2 s is required to change one lane. In this case, $$V_\perp^{max} = W/2$$

may be set. In this case, $$V_\parallel = \sqrt{V^2 - V_\perp^{max^2}}$$

Next, position offsets of P$_a$ and P$_b$ in the lane group G' are obtained, denoted as D$_a$ and D$_b$. As shown in FIG. 5, the prediction of the success rate of lane changing by the vehicle is performed with reference to the following pseudo code:

---

Initialize a variable ForwardDis=Da;
//Traverse L lines between P$_a$ and P$_b$
For (int i = 1; i <= L; i++) {
//An i$^{th}$ line corresponds to a lane crossing an (A+i-1)$^{th}$ lane;
(1) Use W$_i$ to represent a lane width of the (A+i-1)$^{th}$ lane;

(2) Minimum time to cross the lane is $t_i = \dfrac{W_i}{V_\perp^{max}}$;

(3) A distance of forward movement of a vehicle during time to cross the lane is d$_i$ = V$_\parallel$ * t$_i$;
(4) In this case, ForwardDis=ForwarDis+d$_i$;
(5) Forward traverse all triples (start, end, type) in Line$_i$ to find a lane line meeting the following conditions:
1> If start ≤ ForwardDis ≤ end, ForWardDis remains unchanged, and exit a traversal process;
2> if ForwardDis ≤ start, ForWardDis=start and exit the traversal process;
if there is no triple meeting 1> and 2>, returning A-B is not passable and exit an algorithm
}
if (ForwardDis ≤ Db){
Returning A-B is passable (that is, the vehicle can change from the lane A to the lane B);
} else
{Returning A-B is impassable}
(3) For the case of A > B, reference may be made to the foregoing solution (2).

---

Figure 16:
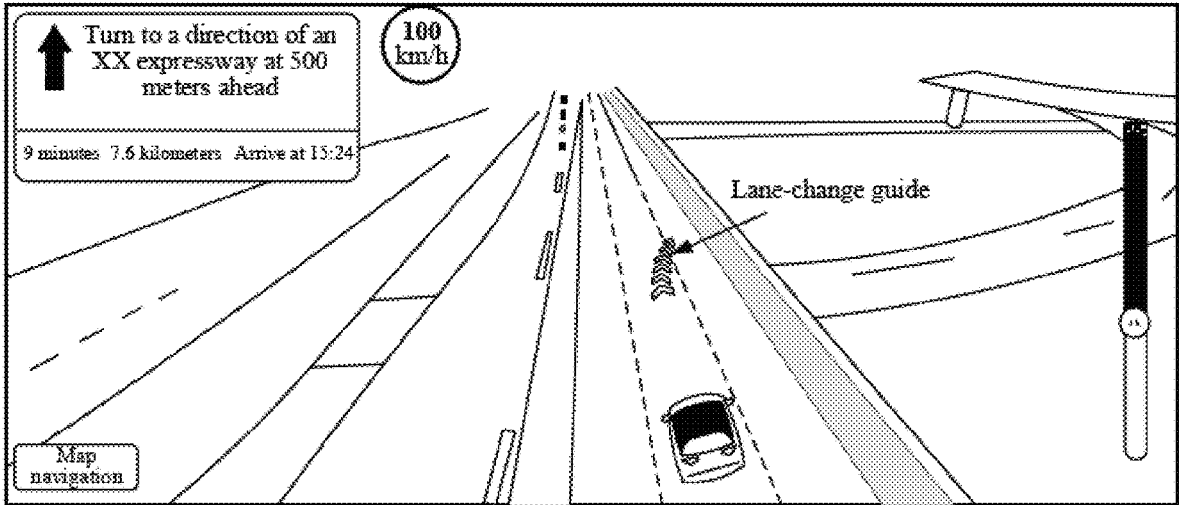
FIG. 16 is a schematic diagram in which a vehicle is prompted to change lanes according to some embodiments.

For example, as shown in FIG. 16, when the vehicle needs to turn to a direction of an XX expressway at 500 meters ahead, it may be quickly determined whether a current position or a position ahead may change lanes to a lane leading to the XX expressway direction, to prompt the user to change lanes in advance, or when a last lane change occasion is missed, a new path may be planned for the user in time.

The solutions comprehensively considers multi-directional factors such as a vehicle speed, a lane width, a quantity of crossed lanes, traffic regulations, and traffic safety to judge whether different lanes may be crossed. Compared with a conventional crossing relationship judgment algorithm, the solutions are more general and universal, and can be applied to the field of intelligent vehicle control technologies, the field of autonomous driving, and the field of advanced assisted driving, and is helpful for specific applications such as lane-level planning and lane-level yawing. In addition, lane-level planning is provided, so that road resources can be allocated more efficiently, and can be applied to a smart city traffic project to alleviate traffic congestion and lane resources are properly allocated for use, which can effectively alleviate traffic congestion, reduce a traffic accident rate, improve traffic safety, reduce energy consumption and environmental pollution, and the like.

The operations in the flowcharts involved in some embodiments are displayed in sequence based on indication of arrows, but the operations are not necessarily performed in sequence based on a sequence indicated by the arrows. Unless otherwise explicitly specified in this specification, execution of the operations is not strictly limited, and the operations may be performed in other sequences. In addition, at least some operations in the related flowcharts in some embodiments may include a plurality of operations or a plurality of stages. The operations or the stages are not necessarily performed at the same moment, but may be performed at different moments. The operations or the stages are not necessarily performed in sequence, but may be performed in turn or with another operation or at least some of operations or stages of the another operation.

Some embodiments provide an apparatus for predicting a success rate of lane changing by a vehicle that implements the foregoing related method for predicting a success rate of lane changing by a vehicle. The implementation solution for solving the problem provided by this apparatus is similar to the implementation solution recorded in the foregoing method. Therefore, for the specific limitations in one or more embodiments of the apparatus for predicting a success rate of lane changing by a vehicle provided below, reference may be made to the foregoing limitations for the method for predicting a success rate of lane changing by a vehicle, and the descriptions are not repeated herein again.

Figure 17:
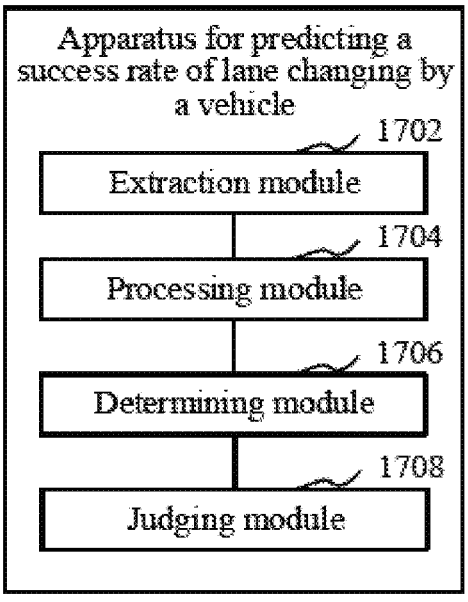
FIG. 17 is a structural block diagram of an apparatus for predicting a success rate of lane changing by a vehicle according to some embodiments.

In some embodiments, as shown in FIG. 17, an apparatus for predicting a success rate of lane changing by a vehicle is provided, the vehicle being located on a traveling road, the traveling road including a plurality of lane groups, each lane group including lane road segments of a plurality of lanes, and the apparatus including: an extraction module 1702, a processing module 1704, a determining module 1706, and a judging module 1708.

The extraction module 1702 is configured to obtain lane-group data of the plurality of lane groups; and determine, from the lane-group data of the plurality of lane groups, feature sets respectively corresponding to a plurality of lane lines of the traveling road, the feature sets each including a plurality of feature subsets corresponding to the plurality of lane groups, and each feature subset including a corresponding lane-line type and a line-segment offset;

the processing module 1704 is configured to remove a feature subset in the plurality of feature subsets that meets a first preset condition from a feature set corresponding to the feature subset, to obtain a remaining feature set;

a determining module 1706 is configured to determine a current position offset of a traveling position of the vehicle in the plurality of lane groups during traveling of the vehicle, the traveling position being located on a first lane of the plurality of lanes; and determine a target position offset of a preset target position of the vehicle in the plurality of lane groups, the preset target position being located on a second lane different from the first lane in the plurality of lanes; and the judging module 1708 is configured to predict, based on the current position offset, the target position offset, the remaining feature set, and traveling information of the vehicle, a success rate of changing from the first lane to the second lane by the vehicle.

In some embodiments, lane line feature extraction is performed on the lane-group data of the traveling road on which the vehicle is located, to obtain the feature set corresponding to each lane line. The feature subset meeting the first preset condition in the feature set is removed, to obtain the remaining feature set that does not include the feature subset meeting the first preset condition. Therefore, based on whether the remaining feature set is an empty set, and with reference to the remaining feature set and the traveling information of the vehicle, the current position offset, and the target position offset, the success rate of lane changing between different lanes when the vehicle travels can be quickly and accurately predicted. In addition, since the remaining feature set that does not include the feature subset meeting the first preset condition is obtained, even if the first lane at which the traveling position is located and the second lane at which the preset target position is located do not belong to the same lane, that the feature set corresponding to the lane line between the traveling position and the preset target position in the remaining feature set is empty can be used to quickly determine that the vehicle cannot travel from the first lane at which the traveling position is located to the second lane at which the preset target position is located. When the feature set in the remaining feature set is not empty, in a process of predicting the success rate of lane changing by the vehicle, considering the traveling information of the vehicle, the lane-line type, the current position offset of the traveling position of the vehicle, and the target position offset of the preset target position, the success rate of changing from the first lane to the second lane by the vehicle can be accurately predicted, thereby improving the accuracy of prediction of the success rate of lane changing by the vehicle, covering a wider application scenario, and effectively improving traffic safety.

In some embodiments, the extraction module 1702 is further configured to read, from the lane-group data of the plurality of lane groups, lane-line types that respectively correspond to a plurality of lane line segments in the plurality of lane groups and that are of the lane lines, and determine line-segment offsets of the plurality of lane line segments in the lane groups in which the plurality of lane line segments are respectively located; combine, for each lane line segment, the lane-line type and the line-segment offset that correspond to the lane line segment, to obtain a feature subset corresponding to each lane line segment; and combine, for each lane line, the feature subsets corresponding to the lane line segments included in the lane line, to obtain the feature sets respectively corresponding to the lane lines.

In some embodiments, the extraction module 1702 is further configured to determine a plurality of lane-line identifiers from the lane-group data of the plurality of lane groups, where the plurality of lane-line identifiers are respectively configured for uniquely identifying one of the plurality of lane lines; and read, from the lane-group data of the plurality of lane groups, the lane-line types of the lane line segments corresponding to a same lane-line identifier.

In some embodiments, the lane-group data is obtained by performing lane reconstruction on original lane-group data of the traveling road, and the original lane-group data is data of each original lane group on the traveling road.

Figure 18:
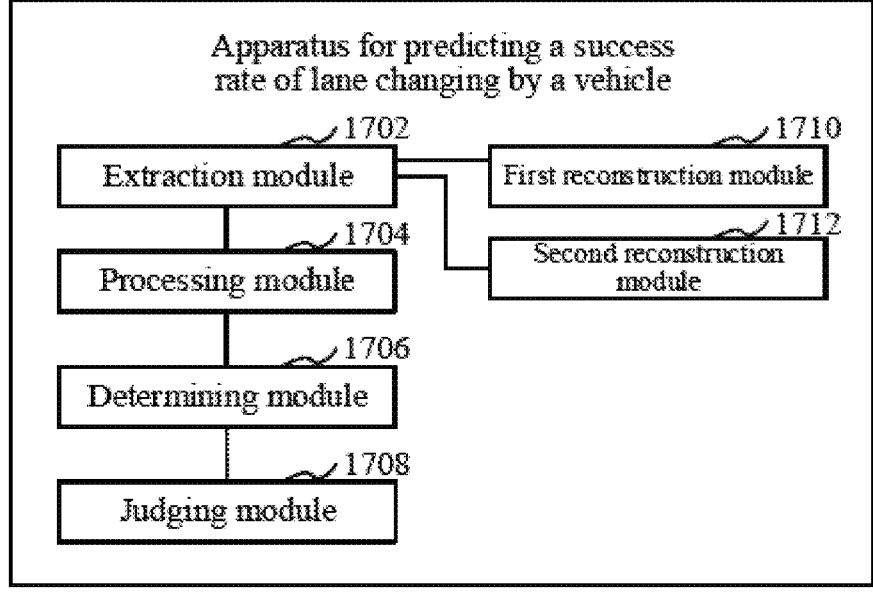
FIG. 18 is a structural block diagram of an apparatus for predicting a success rate of lane changing by a vehicle according to some embodiments.

As shown in FIG. 18, the apparatus further includes: a first reconstruction module 1710, configured to determine a quantity of first lanes of a first original lane group in the original lane-group data, and determine a quantity of second lanes of a second original lane group in the original lane-group data, where the first original lane group and the second original lane group are lane groups that are adjacent to each other on the traveling road; and add a virtual lane to the first original lane group to update the original lane-group data when the quantity of first lanes is less than the quantity of second lanes, where the virtual lane enables the first original lane group to reach lane alignment with the second original lane group; and the lane reconstruction further includes: configuring, in the original lane-group data, a lane feature for the virtual lane, to obtain the lane-group data.

In some embodiments, the first reconstruction module 1710 is further configured to add, to the first original lane group when the quantity of first lanes is less than the quantity of second lanes and an edge lane road segment in the second original lane group and an edge lane road segment in the first original lane group are not on a same lane, a virtual lane that is aligned with the edge lane road segment in the second original lane group.

In some embodiments, the first reconstruction module 1710 is further configured to configure, in the original lane-group data, a first virtual lane width and a first virtual lane line for the virtual lane, where the first virtual lane line is a lane line that belongs to a solid-line type and that represents that a lane change is prohibited, and the first virtual lane width is equal to a target width value.

In some embodiments, lane reconstruction is performed on lane road segments that are not aligned, so that the lanes between the lane groups are aligned after reconstruction, which can facilitate prediction of the success rate of lane changing between different lanes by the vehicle. In addition, during calculation, logical judgment of the quantity of lanes in different lane groups is avoided. Therefore, during autonomous driving (or assisted driving), a calculation speed can be effectively improved, and the calculation efficiency can be improved. In addition, the code complexity is effectively reduced and the code reusability is improved in a development stage.

In some embodiments, the first reconstruction module 1710 is further configured to convert a middle lane road segment in the first original lane group into at least two virtual lanes respectively aligned with at least two lane road segments in the second original lane group when the quantity of first lanes is less than the quantity of second lanes and the middle lane road segment in the first original lane group is split into the at least two lane road segments in the second original lane group.

In some embodiments, the first reconstruction module 1710 is further configured to configure a second virtual lane line of a dashed-line type between the at least two virtual lanes; and configure, in the original lane-group data, second virtual lane widths respectively for the at least two virtual lanes, where a sum of the second virtual lane widths of the at least two virtual lanes is consistent with a lane width of the middle lane road segment.

In some embodiments, the original lane group that is originally curved is converted into a straight lane group, which facilitates time consumption calculation required for lane changing. In other words, there is no need to consider a curvature in a calculation process. In this way, the prediction of the success rate of lane changing between different lanes by the vehicle can be facilitated, the code complexity can be effectively reduced, and the code reusability can be improved.

In some embodiments, the lane-group data is obtained by performing lane reconstruction on the original lane-group data of the traveling road, and the original lane-group data is the data of each original lane group on the traveling road.

As shown in FIG. 18, the apparatus further includes: a second reconstruction module 1712, configured to obtain the original lane-group data of the traveling road; and convert the original lane group in the original lane-group data into a lane group of a straight-line type when the original lane group in the original lane-group data is a lane group with a curvature.

In some embodiments, the feature set includes the feature subset of each lane line segment in the lane line, and the feature subset includes a line-segment offset and a lane-line type of the lane line segment; and the processing module 1704 is further configured to search, in each feature set, a target feature subset meeting the first preset condition; and remove the target feature subset from each feature set, or remove a line-segment offset and a lane-line type from the target feature subset.

In some embodiments, the judging module 1708 is further configured to determine a traveling distance of the vehicle based on the traveling information of the vehicle; and determine a forward position offset of the vehicle based on the traveling distance and the current position offset; and predict, based on the forward position offset, a line-segment offset of each lane line segment in the remaining feature set, and the target position offset, the success rate of changing from the first lane to the second lane by the vehicle.

In some embodiments, the traveling information of the vehicle includes a parallel speed and a vertical speed relative to a lane; the remaining feature set includes a feature-set subsequence between the first lane and the second lane; and the judging module 1708 is further configured to determine, based on the vertical speed and a lane width, time consumption of crossing each lane in the lane group; and determine the traveling distance of the vehicle based on the time consumption and the parallel speed; determine a forward position offset of the vehicle based on the traveling distance and the current position offset of the traveling position; and predict, based on the forward position offset, a line-segment offset of each lane line segment in the feature-set subsequence, and the target position offset, the success rate of changing from the first lane to the second lane by the vehicle.

In some embodiments, the line-segment offset includes an end offset, and a quantity of lane lines in the feature-set subsequence is n, and n is a positive integer not less than 1; and the judging module 1708 is further configured to traverse, in an $i^{th}$ lane line in the feature-set subsequence, the feature subset of each lane line segment in a traveling direction of the vehicle, to obtain a traversal result; determine that a target feature subset meeting a second preset condition exists in the traversal result, where the second preset condition is that the forward position offset is not greater than an end offset corresponding to the $i^{th}$ lane line and not greater than the target position offset of the preset target position; and perform increment or decrement processing on i based on a preset step, and cyclically perform the foregoing operations until i=n or i=1, and when the target feature subset meeting the second preset condition exists in the traversal result of the $i^{th}$ lane line, determine that the vehicle is capable of changing from the first lane to the second lane.

In some embodiments, the judging module 1708 is further configured to when it is determined that the target feature subset meeting the second preset condition does not exist in the traversal result, determine that the vehicle is not capable of changing from the first lane to the second lane.

In some embodiments, the current position offset of the traveling position of the vehicle in the lane group is determined, and the target position offset of the preset target position in the lane group is determined. The lane group is a lane set corresponding to the lane-group data that is on the traveling road. Therefore, for prediction of the success rate of lane changing by the vehicle, comprehensive calculation may be performed by using the current position offset, the target position offset, the feature-set subsequence, the vehicle speed of the vehicle, and the lane width. In consideration of the vehicle speed, the lane width, the lane-line type, the current position offset, and the target position offset, the success rate of crossing from the first lane to the second lane by the vehicle can be accurately calculated, the accuracy of the success rate of lane changing when the vehicle changes lanes is improved, and the covered application scenarios are wider, which effectively improves traffic safety.

The modules in the apparatus for predicting a success rate of lane changing by a vehicle may be implemented entirely or partially by software, hardware, or a combination thereof. The foregoing modules may be built in or independent of a processor of a computer device in a hardware form, or may be stored in a memory of the computer device in a software form, so that the processor invokes and performs an operation corresponding to each of the foregoing modules.

In some embodiments, a computer device is provided. The computer device may be a terminal, and an internal structure diagram thereof may be shown in FIG. 19. The computer device includes a processor, a memory, an input/output interface, a communication interface, a display unit, and an input apparatus. The processor, the memory, and the input/output interface are connected through a system bus, and the communication interface, the display unit, and the input apparatus are connected to the system bus through the input/output interface. The processor of the computer device is configured to provide computing and control capabilities. The memory of the computer device includes a non-volatile storage medium and an internal memory. The non-volatile storage medium stores an operating system and a computer program. The internal memory provides an environment for running of the operating system and the computer program in the non-volatile storage medium. The input/output interface of the computer device is configured to exchange information between the processor and an external device. The communication interface of the computer device is configured to communicate with an external terminal in a wired or a wireless manner, and the wireless manner can be implemented by using WIFI, a mobile cellular network, an NFC (near field communication), or other technologies. The computer program, when executed by the processor, implements a method for predicting a success rate of lane changing by a vehicle. The display unit of the computer device is configured to form a visually visible picture, and may be a display screen, a projection apparatus, or a virtual reality imaging apparatus. The display screen may be a liquid crystal display screen or an electronic ink display screen. The input apparatus of the computer device may be a touch layer covering the display screen, or may be a key, a trackball, or a touch pad disposed on a housing of the computer device, or may be an external keyboard, a touch pad, a mouse, or the like.

Figure 19:
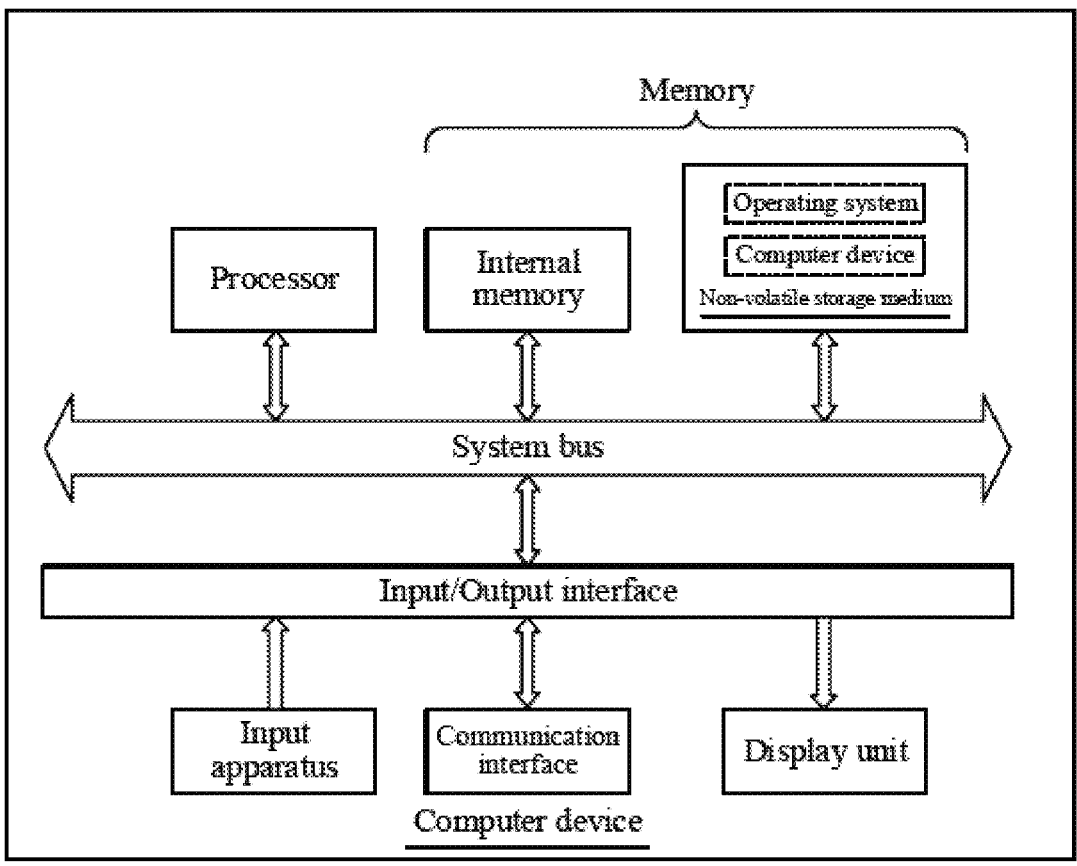
FIG. 19 is a diagram of an internal structure of a computer device according to some embodiments.

A person skilled in the art may understand that, the structure shown in FIG. 19 is only a block diagram of a part of a structure according to some embodiments and does not limit the computer device to which the solution is applied. Specifically, the computer device may include more or fewer components than those in the drawings, or some components are combined, or a different component deployment is used.

In some embodiments, a computer device is provided, including a memory and a processor, the memory having a computer program stored therein, the processor, when executing the computer program, implementing operations of the foregoing method for predicting a success rate of lane changing by a vehicle.

In some embodiments, a computer-readable storage medium is provided, having a computer program stored therein, the computer program, when executed by a processor, implementing operations of the foregoing method for predicting a success rate of lane changing by a vehicle.

In some embodiments, a computer program product is provided, including a computer program, the computer program, when executed by a processor, implementing operations of the foregoing method for predicting a success rate of lane changing by a vehicle.

The user information (including, but not limited to, user equipment information, user personal information, and the like) and the data (including, but not limited to, data for analysis, stored data, displayed data, and the like) involved in some embodiments all are information and data authorized by the user or fully authorized by each party, and the collection, use, and processing of relevant data need to comply with relevant laws and regulations of relevant countries and regions.

A person of ordinary skill in the art may understand that all or some of procedures of the method in some embodiments may be implemented by a computer program instructing relevant hardware. The computer program may be stored in a non-volatile computer-readable storage medium. When the computer program is executed, the procedures of the foregoing method embodiments may be implemented. Any reference to a memory, a database, or another medium used in the embodiments provided in some embodiments may include at least one of a non-volatile memory and a volatile memory. The non-volatile memory may include a read-only memory (ROM), a magnetic tape, a floppy disk, a flash memory, an optical memory, a high-density embedded non-volatile memory, a resistive random access memory (Re-RAM), a magnetoresistive random access memory (MRAM), a ferroelectric random access memory (FRAM), a phase change memory (PCM), a graphene memory, and the like. The volatile memory may include a random access memory (RAM) or an external cache. For the purpose of description instead of limitation, the RAM is available in a plurality of forms, such as a static random access memory (SRAM) or a dynamic random access memory (DRAM). The database involved in the embodiments provided in some embodiments may include at least one of a relational database and a non-relational database. The non-relational database may include a blockchain-based distributed database, but is not limited thereto. The processor involved in the embodiments provided in some embodiments may be a general-purpose processor, a central processing unit, a graphics processing unit, a digital signal processor, a programmable logic device, a quantum computing-based data processing logic device, and are not limited thereto.

The technical features in some embodiments may be randomly combined. For concise descriptions, not all possible combinations of the technical features in the embodiment are described. However, provided that combinations of the technical features do not conflict with each other, the combinations of the technical features are considered as falling within the scope recorded in this specification.

The foregoing embodiments are used for describing, instead of limiting the technical solutions of the disclosure. A person of ordinary skill in the art shall understand that although the disclosure has been described in detail with reference to the foregoing embodiments, modifications can be made to the technical solutions described in the foregoing embodiments, or equivalent replacements can be made to some technical features in the technical solutions, provided that such modifications or replacements do not cause the essence of corresponding technical solutions to depart from the spirit and scope of the technical solutions of the embodiments of the disclosure and the appended claims.

What is claimed is:

1. A method for predicting a success rate of lane changing by a vehicle located on a traveling road comprising a plurality of lane groups, each lane group comprising lane road segments of a plurality of lanes, the method being performed by a computer device, and the method comprising:

obtaining lane-group data of the plurality of lane groups;

determining, from the lane-group data of the plurality of lane groups, feature sets respectively corresponding to a plurality of lane lines of the traveling road, the feature sets each comprising a plurality of feature subsets corresponding to the plurality of lane groups, and each feature subset comprising a corresponding lane-line type and a line-segment offset;

removing a feature subset in the plurality of feature subsets that meets a first preset condition from a feature set corresponding to the feature subset to obtain a remaining feature set;

determining a current position offset of a traveling position of the vehicle in the plurality of lane groups during traveling of the vehicle, the traveling position being located on a first lane of the plurality of lanes;

determining a target position offset of a preset target position of the vehicle in the plurality of lane groups, the preset target position being located on a second lane different from the first lane in the plurality of lanes; and predicting a success rate of changing from the first lane to the second lane by the vehicle based on the current position offset, the target position offset, the remaining feature set, and traveling information of the vehicle, wherein the determining, from the lane-group data of the plurality of lane groups, the feature sets respectively corresponding to the plurality of lane lines of the traveling road comprises:

reading, from the lane-group data of the plurality of lane groups, lane-line types that respectively correspond to a plurality of lane line segments in the plurality of lane groups and that are of the lane lines, and determining line-segment offsets of the plurality of lane line segments in the lane groups in which the plurality of lane line segments are respectively located;

combining, for each lane line segment, the lane-line type and the line-segment offset that correspond to the lane line segment to obtain the feature subset corresponding to each lane line segment; and combining, for each lane line, the feature subsets corresponding to the lane line segments comprised in the lane line to obtain the feature sets respectively corresponding to the lane lines.

2. The method according to claim 1, wherein the reading comprises:

determining a plurality of lane-line identifiers from the lane-group data of the plurality of lane groups, wherein the plurality of lane-line identifiers are respectively configured for uniquely identifying one of the plurality of lane lines; and reading, from the lane-group data of the plurality of lane groups, the lane-line types of the lane line segments corresponding to a same lane-line identifier.

3. The method according to claim 1, wherein the lane-group data is obtained by performing lane reconstruction on original lane-group data of the traveling road, and the original lane-group data is data of each original lane group on the traveling road;

wherein the performing lane reconstruction on the original lane-group data of the traveling road comprises:

determining a quantity of first lanes of a first original lane group in the original lane-group data, and determining a quantity of second lanes of a second original lane group in the original lane-group data, wherein the first original lane group and the second original lane group are lane groups that are adjacent to each other on the traveling road; and adding a virtual lane to the first original lane group to update the original lane-group data when the quantity of first lanes is less than the quantity of second lanes, wherein the virtual lane enables the first original lane group to reach lane alignment with the second original lane group; and wherein the performing lane reconstruction further comprises:

configuring, in the original lane-group data, a lane feature for the virtual lane to obtain the lane-group data.

4. The method according to claim 3, wherein the adding comprises:

adding, to the first original lane group when the quantity of first lanes is less than the quantity of second lanes and an edge lane road segment in the second original lane group and an edge lane road segment in the first original lane group are not on a same lane, a virtual lane that is aligned with the edge lane road segment in the second original lane group.

5. The method according to claim 4, wherein the configuring comprises:

configuring, in the original lane-group data, a first virtual lane width and a first virtual lane line for the virtual lane, wherein the first virtual lane line is a lane line that belongs to a solid-line type and that represents that a lane change is prohibited, and the first virtual lane width is equal to a target width value.

6. The method according to claim 3, wherein the adding comprises:

converting a middle lane road segment in the first original lane group into at least two virtual lanes respectively aligned with at least two lane road segments in the second original lane group when the quantity of first lanes is less than the quantity of second lanes and the middle lane road segment in the first original lane group is split into the at least two lane road segments in the second original lane group.

7. The method according to claim 6, wherein the configuring comprises:

configuring a second virtual lane line of a dashed-line type between the at least two virtual lanes; and configuring, in the original lane-group data, second virtual lane widths respectively for the at least two virtual lanes, wherein a sum of the second virtual lane widths of the at least two virtual lanes is consistent with a lane width of the middle lane road segment.

8. The method according to claim 1, wherein the lane-group data is obtained by performing lane reconstruction on the original lane-group data of the traveling road, and the original lane-group data is the data of each original lane group on the traveling road; and wherein the performing lane reconstruction on the original lane-group data of the traveling road comprises:

obtaining the original lane-group data of the traveling road; and converting the original lane group in the original lane-group data into a lane group of a straight-line type when the original lane group in the original lane-group data is a lane group with a curvature.

9. The method according to claim 1, wherein the removing comprises:

searching, in each feature set, a target feature subset meeting the first preset condition; and removing the target feature subset from each feature set, or removing a line-segment offset and a lane-line type from the target feature subset.

10. The method according to claim 1, wherein the predicting comprises:

determining a traveling distance of the vehicle based on the traveling information of the vehicle;

determining a forward position offset of the vehicle based on the traveling distance and the current position offset; and predicting the success rate of changing from the first lane to the second lane by the vehicle based on the forward position offset, the line-segment offset of each lane line segment in the remaining feature set, and the target position offset.

11. The method according to claim 10, wherein the traveling information of the vehicle comprises a parallel speed and a vertical speed relative to a lane, and the remaining feature set comprises a feature-set subsequence between the first lane and the second lane;

wherein the determining the traveling distance of the vehicle based on the traveling information of the vehicle comprises:

determining, based on the vertical speed and a lane width, time consumption of crossing each lane in the lane group; and determining the traveling distance of the vehicle based on the time consumption and the parallel speed; and wherein the predicting the success rate of changing from the first lane to the second lane by the vehicle based on the forward position offset, the line-segment offset of each lane line segment in the remaining feature set, and the target position offset comprises:

predicting, based on the forward position offset, a line-segment offset of each lane line segment in the feature-set subsequence, and the target position offset, the success rate of changing from the first lane to the second lane by the vehicle.

12. The method according to claim 10, wherein the remaining feature set comprises a feature-set subsequence between the first lane and the second lane; the line-segment offset comprises an end offset, and a quantity of lane lines in the feature-set subsequence is n, and n is a positive integer not less than 1; and wherein the predicting the success rate of changing from the first lane to the second lane by the vehicle based on the forward position offset, the line-segment offset of each lane line segment in the remaining feature set, and the target position offset comprises:

traversing, in an $i^{th}$ lane line in the feature-set subsequence, the feature subset of each lane line segment in a traveling direction of the vehicle, to obtain a traversal result;

determining that a target feature subset meeting a second preset condition exists in the traversal result, wherein the second preset condition is that the forward position offset is not greater than an end offset of the $i^{th}$ lane line and not greater than the target position offset; and performing increment or decrement processing on i based on a preset step, cyclically performing the foregoing operations until i=n or i=1, and when the target feature subset meeting the second preset condition exists in the traversal result of the $i^{th}$ lane line, determining that the vehicle is capable of changing from the first lane to the second lane.

13. The method according to claim 12, further comprising:

based on a determination that the target feature subset meeting the second preset condition does not exist in the traversal result, determining that the vehicle is not capable of changing from the first lane to the second lane.

14. The method according to claim 1, further comprising:

displaying a lane-change guide on an electronic map when the vehicle is capable of changing from the first lane to the second lane, wherein the lane-change guide is configured for indicating the vehicle to change lanes based on the lane-change guide.

15. The method according to claim 1, further comprising:

re-planning a path to the target position when the vehicle is not capable of changing from the first lane to the second lane; and issuing a new-path prompt, the new-path prompt being configured for instructing the vehicle to travel based on the re-planned path.

16. An apparatus for predicting a success rate of lane changing by a vehicle located on a traveling road comprising a plurality of lane groups, each lane group comprising lane road segments of a plurality of lanes, and the apparatus comprising:

at least one memory configured to store computer program code;

at least one processor configured to read the program code and operate as instructed by the program code, the program code comprising:

extraction code configured to cause at least one of the at least one processor to obtain lane-group data of the plurality of lane groups; and determine, from the lane-group data of the plurality of lane groups, feature sets respectively corresponding to a plurality of lane lines of the traveling road, the feature sets each comprising a plurality of feature subsets corresponding to the plurality of lane groups, and each feature subset comprising a corresponding lane-line type and a line-segment offset;

processing code configured to cause at least one of the at least one processor to remove a feature subset in the plurality of feature subsets that meets a first preset condition from a feature set corresponding to the feature subset, to obtain a remaining feature set;

determining code configured to cause at least one of the at least one processor to determine a current position offset of a traveling position of the vehicle in the plurality of lane groups during traveling of the vehicle, the traveling position being located on a first lane on the plurality of lanes; and determine a target position offset of a preset target position of the vehicle in the plurality of lane groups, the preset target position being located on a second lane different from the first lane in the plurality of lanes; and judging code configured to cause at least one of the at least one processor to predict a success rate of changing from the first lane to the second lane by the vehicle based on the current position offset, the target position offset, the remaining feature set, and traveling information of the vehicle, wherein the extraction code is further configured to cause at least one of the at least one processor to:

read, from the lane-group data of the plurality of lane groups, lane-line types that respectively correspond to a plurality of lane line segments in the plurality of lane groups and that are of the lane lines, and determine line-segment offsets of the plurality of lane line segments in the lane groups in which the plurality of lane line segments are respectively located;

combine, for each lane line segment, the lane-line type and the line-segment offset that correspond to the lane line segment to obtain the feature subset corresponding to each lane line segment; and combine, for each lane line, the feature subsets corresponding to the lane line segments comprised in the lane line to obtain the feature sets respectively corresponding to the lane lines.

17. The apparatus according to claim 16, wherein the extraction code is further configured to cause at least one of the at least one processor to:

determine a plurality of lane-line identifiers from the lane-group data of the plurality of lane groups, wherein the plurality of lane-line identifiers are respectively configured for uniquely identifying one of the plurality of lane lines; and read, from the lane-group data of the plurality of lane groups, the lane-line types of the lane line segments corresponding to a same lane-line identifier.

18. A non-transitory computer-readable storage medium storing computer code which, when executed by at least one processor, causes the at least one processor to at least:

obtain lane-group data of a plurality of lane groups of a traveling road on which a vehicle is located, each lane group comprising lane road segments of a plurality of lanes;

determine, from the lane-group data of the plurality of lane groups, feature sets respectively corresponding to a plurality of lane lines of the traveling road, the feature sets each comprising a plurality of feature subsets corresponding to the plurality of lane groups, and each feature subset comprising a corresponding lane-line type and a line-segment offset;

remove a feature subset in the plurality of feature subsets that meets a first preset condition from a feature set corresponding to the feature subset to obtain a remaining feature set determine a current position offset of a traveling position of the vehicle in the plurality of lane groups during traveling of the vehicle, the traveling position being located on a first lane of the plurality of lanes;

determine a target position offset of a preset target position of the vehicle in the plurality of lane groups, the preset target position being located on a second lane different from the first lane in the plurality of lanes; and predict a success rate of changing from the first lane to the second lane by the vehicle based on the current position offset, the target position offset, the remaining feature set, and traveling information of the vehicle, wherein the determine, from the lane-group data of the plurality of lane groups, the feature sets respectively corresponding to the plurality of lane lines of the traveling road comprises:

reading, from the lane-group data of the plurality of lane groups, lane-line types that respectively correspond to a plurality of lane line segments in the plurality of lane groups and that are of the lane lines, and determining line-segment offsets of the plurality of lane line segments in the lane groups in which the plurality of lane line segments are respectively located;

combining, for each lane line segment, the lane-line type and the line-segment offset that correspond to the lane line segment to obtain the feature subset corresponding to each lane line segment; and combining, for each lane line, the feature subsets corresponding to the lane line segments comprised in the lane line to obtain the feature sets respectively corresponding to the lane lines.

* * * * *